(12) United States Patent
Nagatani

(10) Patent No.: US 6,734,999 B1
(45) Date of Patent: May 11, 2004

(54) IMAGE FORMING APPARATUS AND IMAGE FORMING METHOD

(75) Inventor: Kentaro Nagatani, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/995,934

(22) Filed: Dec. 22, 1997

(30) Foreign Application Priority Data

Dec. 24, 1996 (JP) .............................................. 8-343158

(51) Int. Cl.⁷ .................................................. H04N 1/04
(52) U.S. Cl. ........................ 358/498; 358/296; 358/497; 355/114
(58) Field of Search ................................ 358/498, 296, 358/497, 488, 449; 382/287, 286, 291, 294, 295, 296, 297–306, 317; 355/114, 127; 399/84

(56) References Cited

U.S. PATENT DOCUMENTS

| | | | | |
|---|---|---|---|---|
| 4,365,886 A | * | 12/1982 | Murakami et al. | 355/3 |
| 4,602,776 A | * | 7/1986 | York et al. | 271/4 |
| 4,757,348 A | * | 7/1988 | Rourke et al. | 355/6 |
| 4,974,035 A | * | 11/1990 | Rabb et al. | 355/320 |
| 4,987,447 A | * | 1/1991 | Ojha | 355/204 |
| 5,207,412 A | * | 5/1993 | Coons, Jr. et al. | 270/1.1 |
| 5,237,382 A | * | 8/1993 | Matsumura | 355/323 |
| 5,291,592 A | | 3/1994 | Kita | 395/600 |
| 5,316,279 A | * | 5/1994 | Corona et al. | 270/1.1 |
| 5,329,345 A | * | 7/1994 | Nagatani | 355/316 |

FOREIGN PATENT DOCUMENTS

| | | |
|---|---|---|
| JP | 2-300855 | 12/1990 |
| JP | 5-294502 | 11/1993 |

* cited by examiner

*Primary Examiner*—Mark Wallerson
(74) *Attorney, Agent, or Firm*—Burns, Doane, Swecker & Mathis, LLP

(57) ABSTRACT

An image forming apparatus has a plurality of paper insertion modes. An image of a document is formed based on image data by an image reader. If a document which is read in a state different from other documents in a plurality of documents, it is decided as a document specifying paper insertion. When the document specifying paper insertion is detected, a second sheet different from a first paper is supplied for insertion. The image of the document specifying paper insertion may be formed on the second sheet, or no image is formed on the second sheet. In a different mode, the second sheet is inserted just before or after a first sheet on which the image of the document specifying paper insertion is formed.

22 Claims, 21 Drawing Sheets

Fig.9

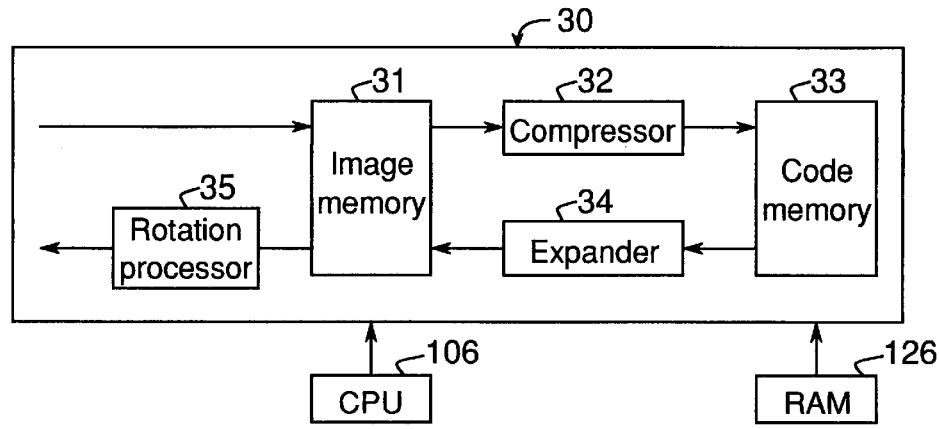

Fig.10

| | | |
|---|---|---|
| 0 | Comp. data 1 of page 1 | Area01 |
| 32K | Comp. data 2 of page 1 | Area02 |
| 64K | Comp. data 1 of page 2 | Area03 |
| 96K | Comp. data 2 of page 2 | Area04 |
| 128K | ⋮ | ⋮ |

Fig.11

| Area | Page | Front connection number | Rear connection number | Additional information |
|---|---|---|---|---|
| 01 | 1 | FF | 02 | Document image not specifying insertion position<br>No need of image rotation<br>(no need of image shift) |
| 02 | 1 | 01 | FF | Document image not specifying insertion position<br>No need of image rotation<br>(no need of image shift) |
| 03 | 2 | FF | 04 | Document image specifying insertion position<br>Need of image rotation<br>(need of image shift) |
| 04 | 2 | 03 | FF | Document image specifying insertion position<br>Need of image rotation<br>(need of image shift) |
| ⋮ | ⋮ | ⋮ | ⋮ | |

IMAGE FORMING APPARATUS AND IMAGE FORMING METHOD

BACKGROUND OF THE INVENTION

1. Field of the Invention

The present invention relates to an image forming apparatus such as a copying machine and an image forming method.

2. Description of Prior Art

This application is based on application No. 8-343158 filed in Japan, the content of which is incorporated hereinto by reference.

When images of a plurality of documents are processed, it is known to insert a paper such as a colored paper among the documents to be processed. For example, in the apparatuses described in Japanese Patent laid open Publications 2-300855/1990 and 5-294502/1993, when images of a plurality of documents put on a document tray are processed, a special paper different from normal papers is inserted at a predetermined position among the documents. In such apparatuses, it is needed that the special paper has to be inserted by a user at a predetermined position among the documents put on a document tray. Further, it is also needed that the inserted special paper has to be removed by a user from the documents after the processing is completed. These operations are troublesome for a user. It is also proposed to start image forming after a page at which a different paper is inserted is designated beforehand with an operational panel. However, when the number of documents is large, a user has to designate the page to be inserted with much attention and this is inconvenient for a user.

SUMMARY OF THE INVENTION

An object of the present invention is to provide an image forming apparatus which designates an insertion position of paper in a simple way.

In an image forming apparatus of the invention, an image reading unit reads a plurality of documents successively to generate image data thereof, and an image forming unit forms an image on a sheet based on the image data generated by the image reading unit. On the other hand, a detecting unit detects whether a document is a specified document or not, wherein the specifying document denotes a document to be read in a state different from other documents in the plurality of documents. That is, the specifying document is designated simply by putting it in a different state. A first sheet feeding unit is provided to supply a first sheet for forming an image thereon, and a second sheet feeding unit is provided for paper insertion to supply a second sheet different from the first sheet. A controller makes the first sheet feeding unit supply the first sheet for forming an image thereon. When the document read by the image reading unit is detected to be the specifying document, the controller makes the second sheet feeding unit supply the second sheet instead of the first sheet. The image of the document specifying paper insertion may be formed on the second sheet, or no image is formed on the second sheet. In a different mode, the second sheet is inserted just before or after a normal sheet on which the image of the document specifying paper insertion is formed.

An advantage of the present invention is that a position at which paper insertion is desired can be determined easily by simply putting a document at the paper insertion position differently from other documents.

BRIEF DESCRIPTION OF THE DRAWINGS

These and other objects and features of the present invention will become clear from the following description taken in conjunction with the preferred embodiments thereof with reference to the accompanying drawings, and in which:

FIG. 9 is a block diagram of a memory unit;

FIG. 10 is a diagram of an example of data storage in a code memory;

FIG. 11 is a diagram of an example of management table MT1;

DETAILED DESCRIPTION OF THE PREFERRED EMBODIMENTS

Figure 1:
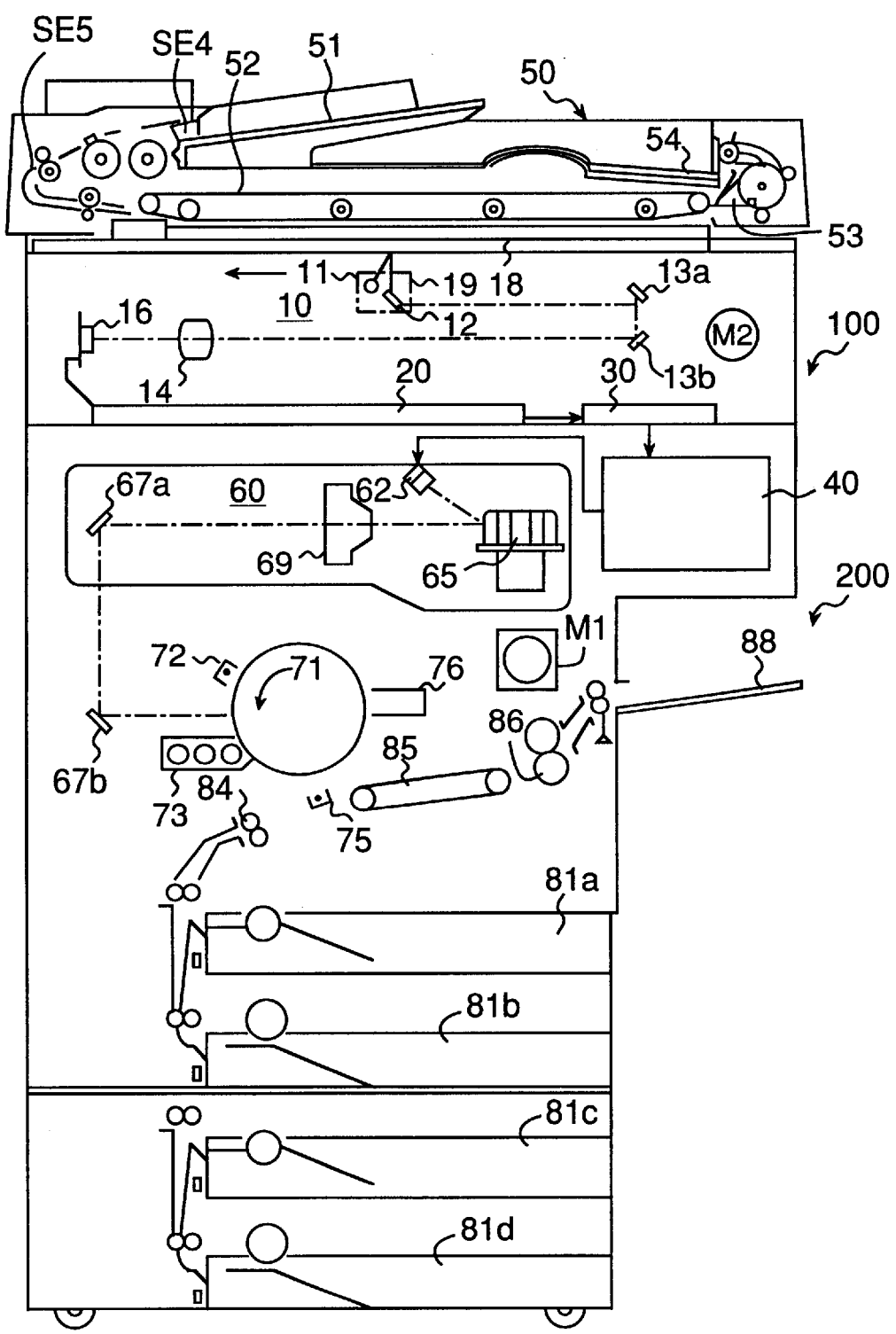
FIG. 1 is a schematic sectional view of a printer.

Referring now to the drawings, wherein like reference characters designate like or corresponding parts throughout the views, a copying machine of an embodiment of the invention is explained. The copying machine has first, second and third paper insertion modes, wherein when a document among a plurality of documents put on a document tray is detected to be put in a different state from the others, a paper different from normal papers (hereinafter referred also to insertion paper) is inserted at the position of the detected document, and the image of the document is formed on the insertion paper or on a normal paper supplied just before or just after the insertion paper. The three paper insertion modes are explained in detail later.

FIG. 1 shows a digital electrophotographic copying machine of an embodiment of the invention. The copying machine includes mainly an image reader 100 for reading a document image to convert it to image data and a printer 200 for forming an image on a sheet of paper based on the image data.

An automatic document feeder 50 is provided on the image reader 100. It feeds documents put on a document tray 51 onto a predetermined position on a platen glass 18 one by one successively from the bottom of the documents piled on the tray 51. When image read of the document is completed, the document is carried with a belt 52 onto a discharge tray 54. A sensor SE4 detects a position of the document on the document tray 51 along the main scan direction perpendicular to the document feed direction, and another sensor SE5 provided along a document feed path detects passage of a document. As will be explained later, a document feed controller 107 (refer to FIG. 6) decides based on the detection signals of the sensors SE4 and SE5 whether the document carried from the document tray 51 onto the platen glass 18 is a document to specify an insertion position of insertion paper or not. When both faces of a document are read, after image read of one face is completed, the position of a claw 53 is changed to reverse the document face and to put the document again onto the platen glass 18.

In the image reader 100, a document put on the platen glass 18 is illuminated with a lamp 11 mounted, on a scanner 19. A light reflected from a document face is guided through mirrors 12, 13a and 13b and a focus lens 14 to be focused onto a CCD line sensor 16. The scanner 19 with the lamp 11 is moved by a scanner motor M2 along a direction (subscan direction) shown with an arrow at a speed V in correspondence to the magnifying power. Thus, the document is scanned over the whole face thereof. The mirrors 13a and 13b are moved at a speed V/2 along the same direction in correspondence to the movement of the scanner 19.

An image processor 20 processes image signals received from the CCD line sensor 16 for MTF correction and the like, and a memory unit 30 codes the image data for compression to be stored therein. The memory unit 30 expands the stored data according to a request by the system, rotates the data if needed, and supplies the image data as print data to the printer 200.

In the printer 200, a print processor 40 generates laser drive signals according to the print data received from the memory unit 30, and a laser diode 62 in an optical system 60 of the printer emits a laser beam according to the laser drive signals. The laser beam emitted by the laser diode 62 is deflected by a polygon mirror 65 rotating fast, is removed on distortion abberation by an f-θ lens 69, and propagates through mirrors 67a and 67b to scan or expose the surface of a photoconductor drum 71. The surface has been charged uniformly for each copy before the exposure. Then, an electrostatic latent image is formed by the exposure of the laser beam on the surface of the photoconductor drum 71. The latent image is developed by a development unit 73 to form a toner image. On the other hand, a sheet of paper of appropriate size is carried from one of paper cassettes 81a–81d to a pair of timing rollers 84, and the timing rollers 84 carry the paper to a transfer section at a timing so that a top of the toner image formed on the photoconductor drum 71 agrees with a top of the paper. At the transfer section, the toner image on the photoconductor drum 71 is transferred onto the paper with a transfer charger 75. The paper with the transferred toner image is separated from the photoconductor drum 71 and carried on a carriage belt 85 and passes through a fixing device 86 for fixing the toner image. Then, the paper is discharged on a tray 88.

Figure 2:
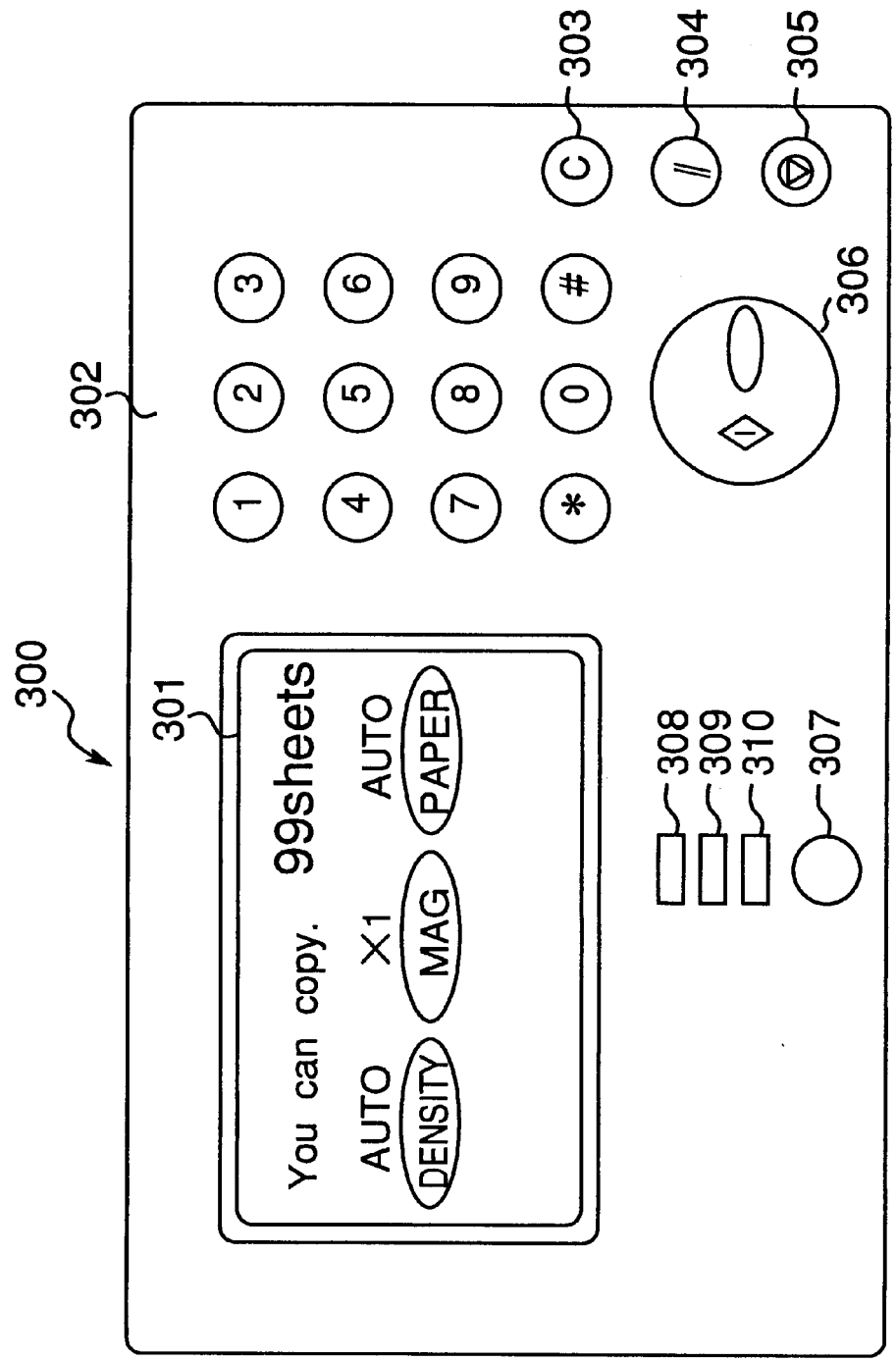
FIG. 2 is a front view of an operational panel.

FIG. 2 is a front view of an operational panel 300 of the copying machine. A liquid crystal display device 301 displays setting conditions such as copy number, copy density, copy magnifying power and the like. Ten-keys 302 are provided to input the numerical values of the copy number, the magnifying power and the like. A clear key 303 is a key for resetting the content of the setting to default values. An interrupt key 304 is a key for starting interrupt processing. A stop key 305 is a key for stopping copy operation, and a start key 306 is a key for starting copy operation. A key 307 is provided to set the first, second or third paper insertion mode. The first paper insertion mode, the second one, the third one and the normal mode are set cyclically for each pressing of the key 307. A light emitting diode 308 is turned on when the first paper insertion mode is set, another light emitting diode 309 is turned on when the second paper insertion mode is set, and a further light emitting diode 310 is turned on when the third paper insertion mode is set. No light emitting diode is turned on in the normal mode.

Next, the copy operation in the first to third paper insertion modes is explained in a simple way (details thereof are explained later). A user designates a document specifying an insertion position by putting the document on the document tray 51 in a state different from other normal documents (such as a first document among the documents).

Figure 3:
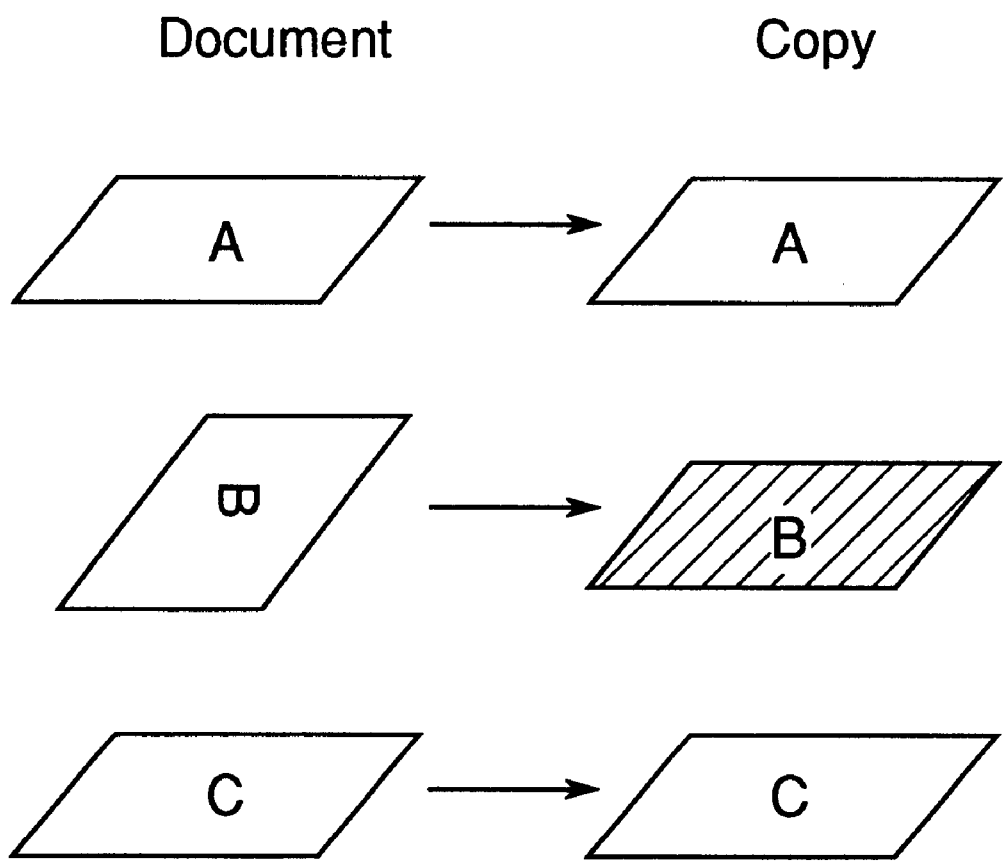
FIG. 3 is a diagram for illustrating the content of copies in the first paper insertion mode.

In the first paper insertion mode, when a document specifying an insertion position is detected, a paper different from a normal paper (or an insertion paper) is supplied, and the image of the document is formed on the insertion paper. FIG. 3 illustrates an example of the content of copies in the first paper insertion mode. Among the three documents A, B and C, the document B is put on the document tray 51 differently from the other documents A and C. The direction of the documents A and C is normal. First, the image of the document A is formed on a paper supplied from the first paper cassette. Next, the document B is detected as a document specifying an insertion position because the document is set in a direction different from others. Then, a sheet of insertion paper such as a colored paper (a hatched paper shown in FIG. 3) is supplied in correspondence to the document from a second paper cassette different from the first paper cassette for the other documents, and the document image is formed on the insertion paper. Next, the image of the document C is formed on a paper supplied again from the first paper cassette.

Figure 4:
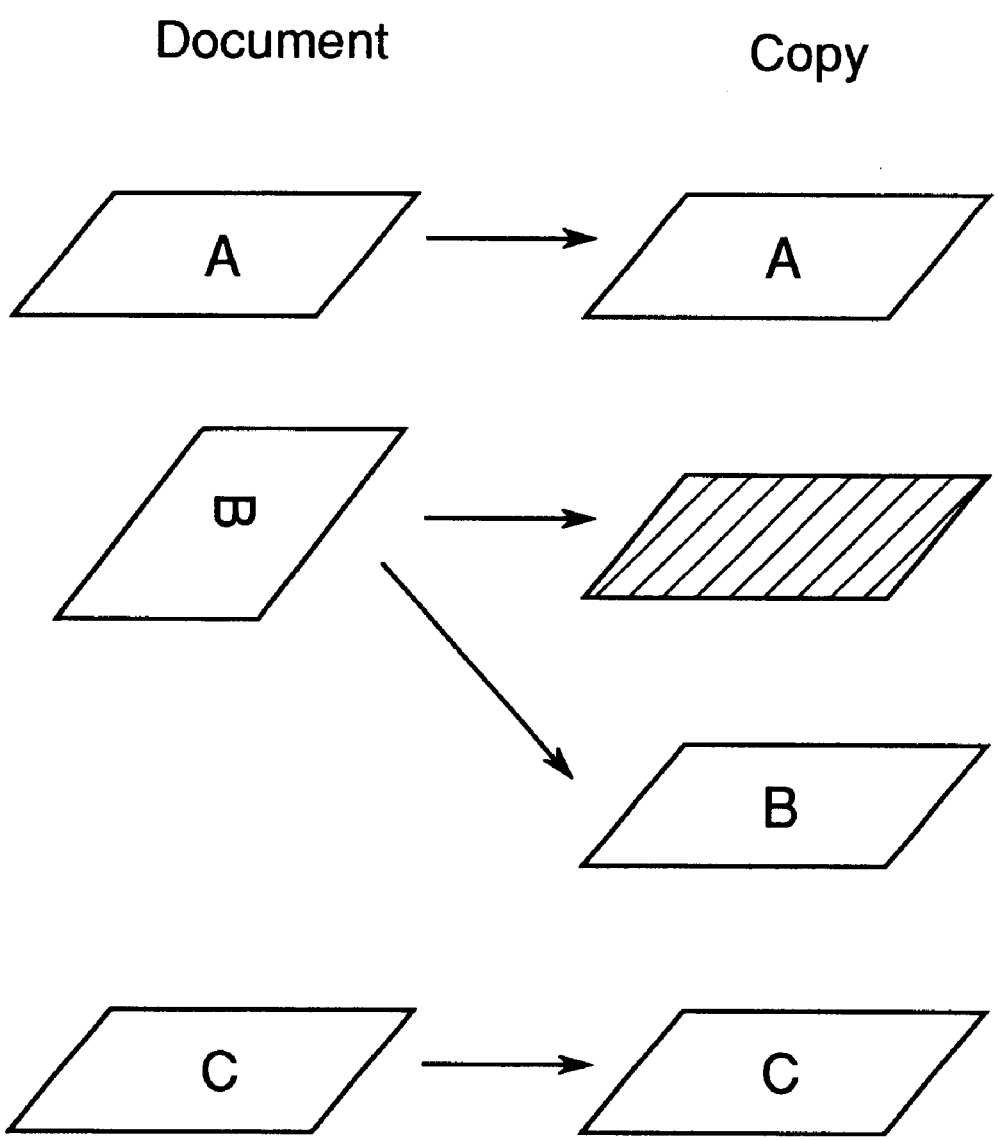
FIG. 4 is a diagram for illustrating the content of copies in the second paper insertion mode.

In the second paper insertion mode, when a document specifying an insertion position is detected, a sheet of paper for paper insertion (or an insertion paper) is first supplied from a second paper cassette different from a first paper cassette for the other documents, and is discharged without forming any image thereon. Then, the image of the document is formed on a paper supplied again from the first paper cassette. FIG. 4 illustrates an example of the content of copies in the second paper insertion mode. Similarly to FIG. 3, among the three documents A, B and C, the document B is put on the document tray 51 differently from the other documents A and C. First, the image of the document A is formed on a paper supplied from the first paper cassette. Next, the document B is detected as a document specifying an insertion position because the direction thereof is different from those of the others. Then, a sheet of insertion paper such as a colored paper (a hatched paper shown in FIG. 4) is supplied in correspondence to the document from a second paper cassette different from the first paper cassette, and it is discharged without forming any image thereon. Then, the first paper cassette is selected again, and the image of the document B is formed on a sheet of paper supplied from the first paper cassette. Next, the image of the document C is formed on a paper supplied from the first paper cassette.

Figure 5:
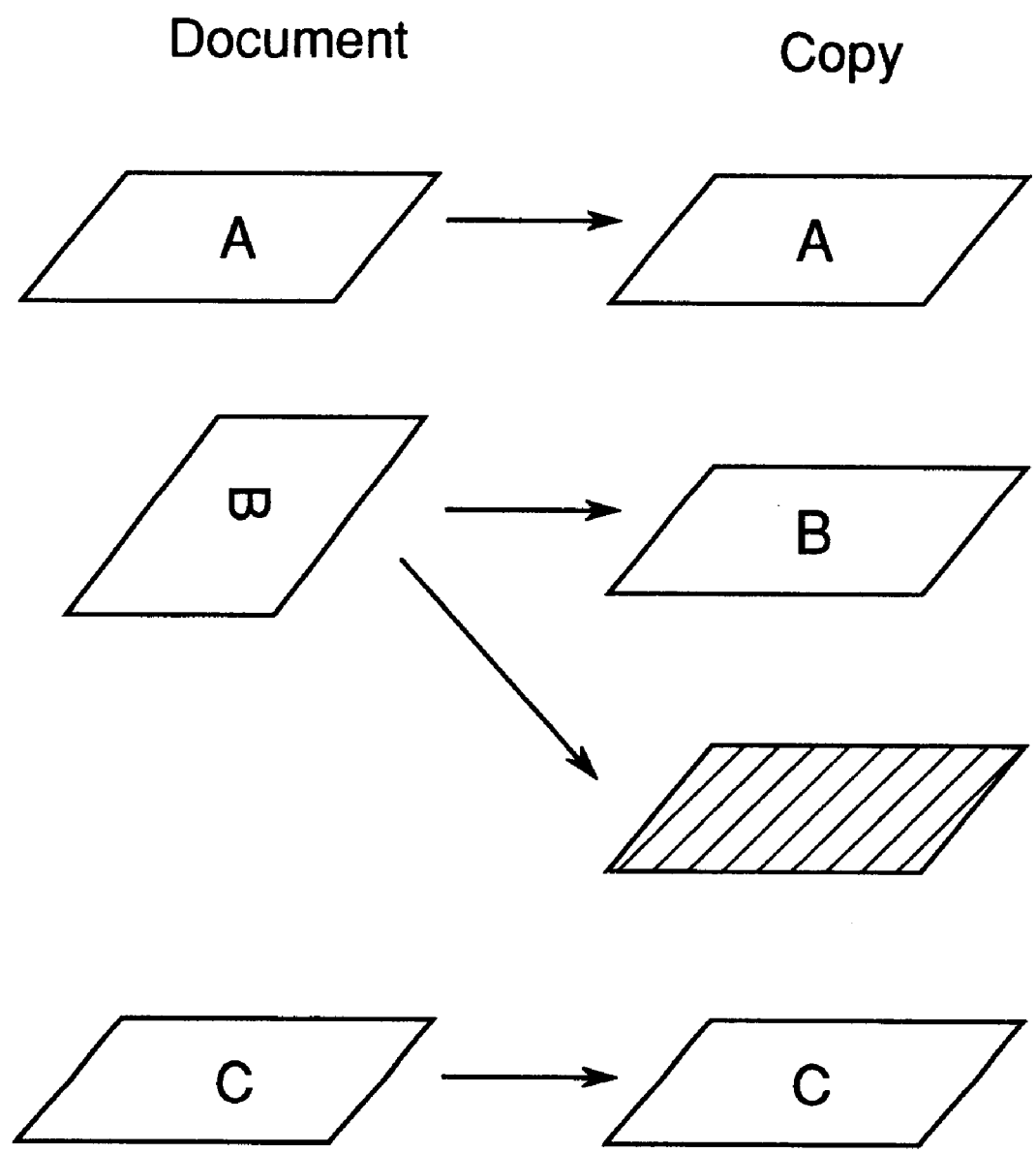
FIG. 5 is a diagram for illustrating the content of copies in the third paper insertion mode.

In the third paper insertion mode, when a document specifying an insertion position is detected, an image of the document is first formed on a sheet of paper supplied from a first paper cassette. Then, a sheet of insertion paper is supplied from a second paper cassette different from the first paper cassette, and it is discharged without forming any image thereon. FIG. 5 illustrates an example of the content of copies in the third paper insertion mode. Similarly to FIGS. 3 and 4, among the three documents A, B and C, the document B is put on the document tray 51 differently from the other documents A and C. First, the image of the document A is formed on a paper supplied from the first paper cassette. Next, the document B is detected as a document specifying an insertion position because the direction thereof is different from those of the others. First, the image of the document B is formed on a sheet of paper supplied from the first paper cassette. Then, a sheet of insertion paper such as a colored paper (a hatched paper shown in FIG. 5) is supplied from a second paper cassette different from the first paper cassette for the other documents in correspondence to the document, and it is discharged without forming any image thereon. Next, the image of the document C is formed on a paper supplied again from the first paper cassette.

Figure 6:
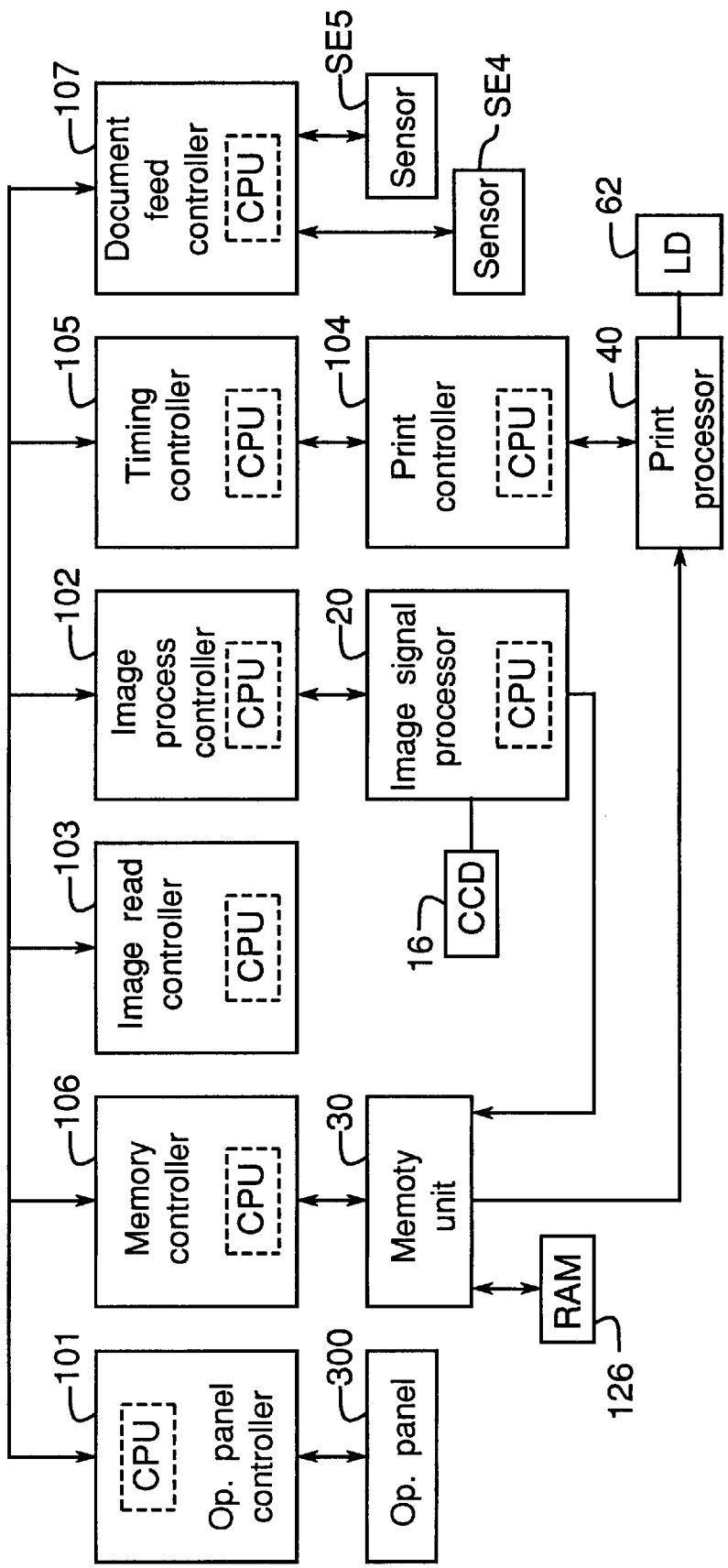
FIG. 6 is a block diagram of a controller of the copying machine.

FIG. 6 is a block diagram of a control system of the copying machine. The control system includes seven controllers 101–107, each of which having a central processing unit (CPU), a read only memory (ROM) for storing programs and a random access memory (RAM) used as a working area, and the controllers 101–107 are connected to each other with a serial input/output. An operational panel controller 101 receives key-inputs from the operational panel 300 and controls the display device 301 and the light emitting diodes 308–310 according to the key-inputs. An image process controller 102 controls the image signal processor 20. An image read controller 103 controls the scanner motor M2 and the like. A printer controller 104 receives detection signals from various sensors provided in the printer 200 and controls the print processor 40 including the laser diode 62. A timing controller 105 adjusts timings of the controllers connected through the serial input/output and sets an operation mode. A memory controller 106 controls the memory unit 30 to process image data received from the image signal processor 20 and to generate print data to be sent to the print processor 40, for image forming. A document feed controller 107 controls the automatic document feeder 50. It also detects a document put on the document tray 51 in a state different from normal documents as a document specifying an insertion position.

Figure 7:
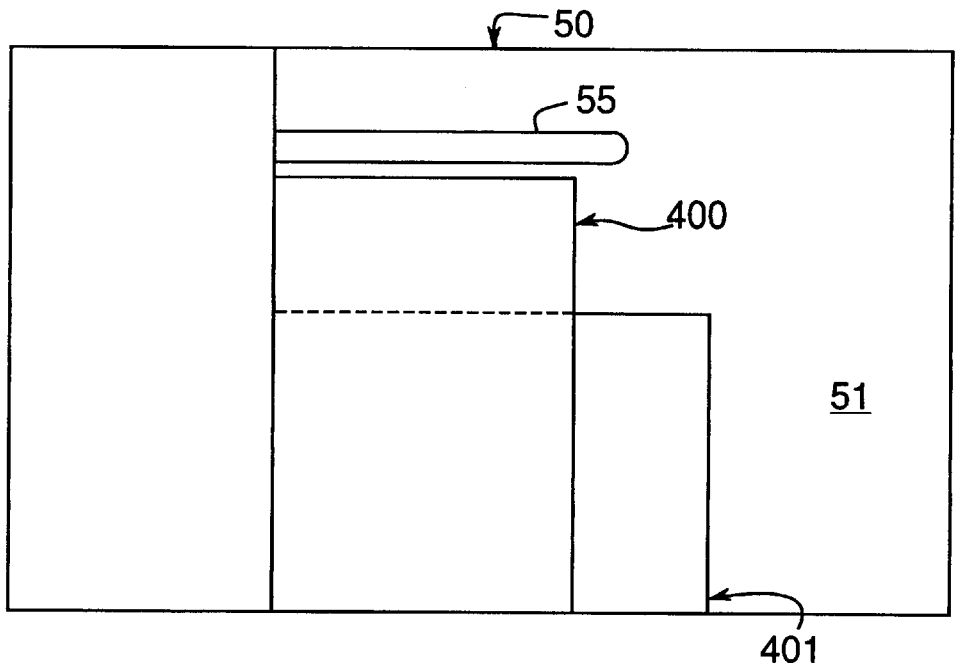
FIG. 7 is a diagram for illustrating examples of putting a document with specified insertion position.

There are two ways for a user to designate a document which specifies an insertion position on the document tray 51. FIG. 7 shows a method for putting a document specifying an insertion position on the document tray 51. Normal documents 400 are put between an end line of the tray 51 and a partition lever 55 extending along the document feed direction on the tray 51. The longitudinal direction thereof extends laterally or perpendicularly to the document feed direction. On the other hand, a document 401 specifying an insertion position is put on the document tray 51 so that the longitudinal direction thereof extends along a direction rotated by 90° from that of a normal document. That is, the longitudinal direction thereof is parallel to the document feed direction. The document feed controller 107 measures a pass time of a document with the sensor SE5 while the document is fed and determines the length of the document in the document feed direction. Then, a document 401 put in a different direction from the other documents 400 (especially the first document among the documents) is determined based on the length of the document in the document feed direction as a document specifying an insertion position.

Figure 8:
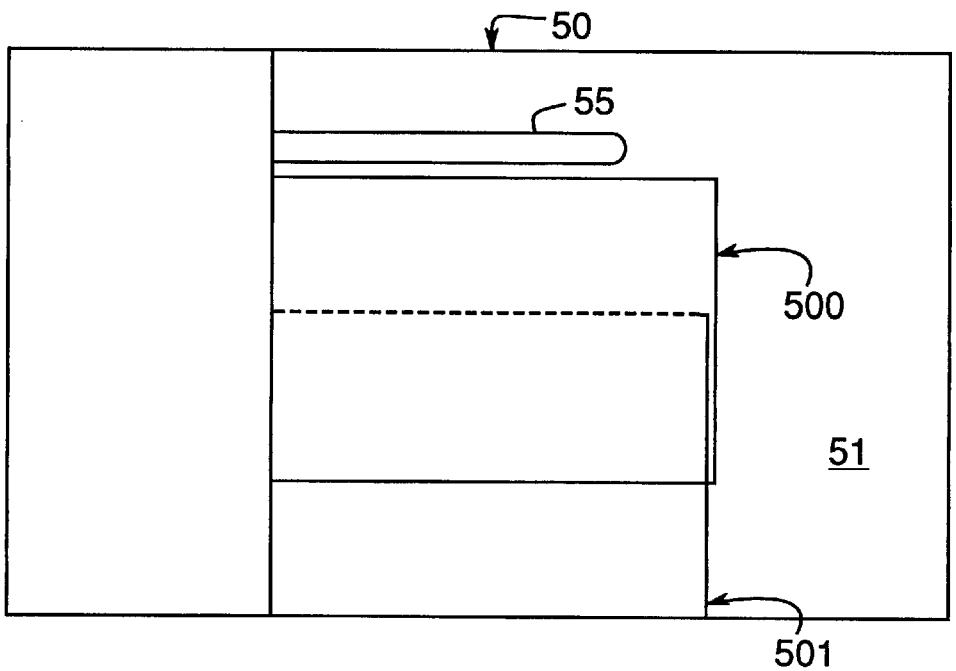
FIG. 8 is another diagram for illustrating examples of putting a document with specified insertion position.

FIG. 8 shows another method for putting a document specifying an insertion position on the document tray 51 of the automatic document feeder 50. Normal documents 500 are put so that they are put besides the partition lever 55 extending along the document deed position on the document tray 51, while it is separated from the end line of the document tray 51. On the other hand, a document 501 specifying an insertion position is put on the document tray 51 besides the end line thereof shifted from the partition lever 55. The document feed controller 107 detects a document shifted from other documents in the main scan direction (especially the first document among the documents) by a certain length from the partition lever 55 with the sensor SE4 and determines it as a document specifying an insertion position.

Though the two methods are explained above for putting a document specifying an insertion position, a different putting method may also be used provided that a document specifying an insertion position can be discriminated from normal documents and that a means can be provided for correcting a "difference" of the document specifying an insertion position which is put on the tray in a different way from normal documents.

FIG. 9 shows a structure of the memory unit 30 controlled by the memory controller 106. In the memory unit 30, input print data are stored temporarily in an image memory 31. The print data stored in the image memory 31 are coded for compression by a compressor 32 to be stored in a code memory 33. At a predetermined timing, the memory controller 106 expands the code data stored in the code memory 33 by an expander 34 to be written to the image memory 31. The image data in the image memory 31 is rotated if necessary by a rotation processor 35 and sent to the print processor 40.

FIG. 10 shows an example of data storage in the code memory 33. The code memory 33 is divided into memory areas in the unit of 32 Kbytes, and each area stores code data (compressed data) in a page in consideration of simultaneous control of read and write. The memory controller 106 produces a management table MT1 in the RAM 126 (refer to FIGS. 6 and 9) when code data are written to the memory areas of the code memory 33.

FIG. 11 shows an example of the management table MT1 which stores a number of memory area, a page number which code data written to a memory area belongs to, front connection number, rear connection number, and additional information on image rotation and image shift. The front and rear connection numbers show connection between a plurality of memory areas for code data in one page. The front connection number shows connection of a memory area for the front direction, and it also shows that the relevant memory area is the top of the memory areas for one page. If the memory area is the top, the front connection number is "FF", otherwise it is the number of the memory area connected in the front direction. Similarly, the rear connection number shows connection of memory areas for the rear direction, and it also shows that the relevant memory area is the last of the memory areas in one page. If the memory area is the last, the rear connection number is "FF", otherwise it is the number of the memory area connected in the rear direction. If a document 401 specifying an insertion position is put on the document tray 51 in the manner as shown in FIG. 7, data which indicates a need of image rotation is written to the management table MT1 as the additional information. If a document 501 specifying an insertion position is put on the document tray 51 in the manner as shown in FIG. 8, data which indicates a need of image shift is written to the management table MT1 as the additional information. The memory controller 106 manages the data in the code memory 33 with reference to the management table MT1. Further, the memory controller 106 clears relevant data in the management table MT1 after reading code data from the code memory 33 repeatedly by the number of copies.

Figure 12:
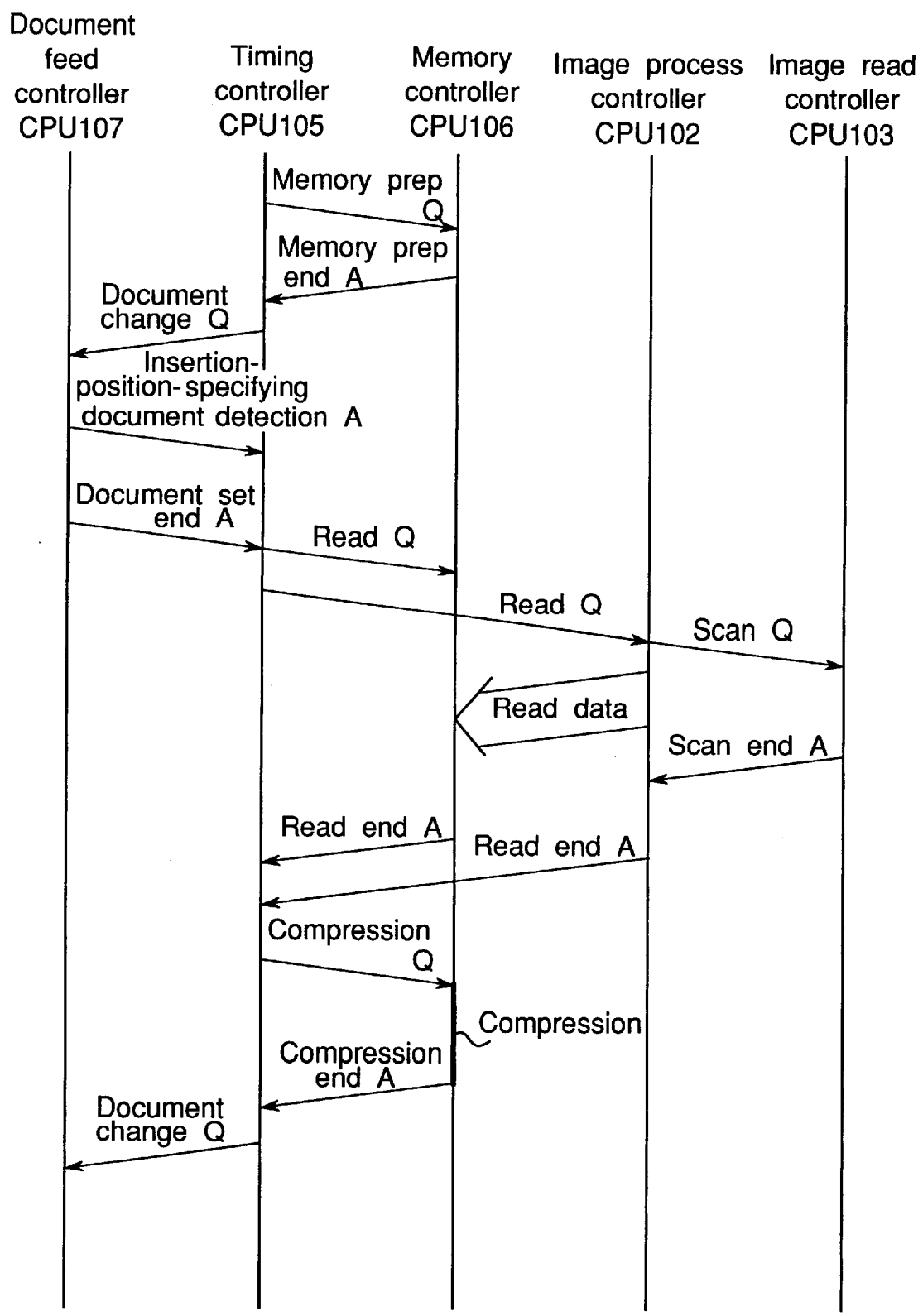
FIG. 12 is a sequence diagram of data write.

FIG. 12 is a sequence diagram of communications of commands, reports and image data between the controllers when document image data read by the image reader 100 are written to the code memory 33. In the sequence diagram shown in FIG. 12 and following FIGS. 13 and 14, "Q" denotes a request command, and "A" denotes a report sent in accordance to a request command. Unimportant commands and reports are omitted in the sequence diagrams.

In FIG. 12, first, the timing controller 105 which controls the entire sequence sends a memory preparation request command to the memory controller 106. Then, the memory controller 106 sets a start address of a memory area in the image memory 31, XY length information and the like to the internal hardware. When the memory preparation ends, the memory controller 106 sends a memory preparation end report to the timing controller 105. In response thereto, the timing controller 105 sends a document change request command to the document feed controller 107. Then, the document feed controller 107 discharges a document put on the platen glass 18 onto the tray 54 and feeds a next document in the document tray 51 onto the platen glass 18 at a predetermined position. It also sends an insertion-position-specifying document detection report to the timing controller 105 if the next document is decided to be a document put in a different way from other documents (such as the first document). On the other hand, if the next document is decided to be a document put in the same way as the other documents, the report is not sent. When the next document reaches to the predetermined position on the platen glass 18, the document feed controller 107 sends a document set end report to the timing controller 105.

After the timing controller 105 receives the document set end report, it sends a read request command to the memory controller 106 and to the image process controller 102. Then, the image process controller 102 sends a scan request command to the image read controller 103. In response thereto, the image read controller 103 starts to drive the scan motor M2 and to read image data of the document put on the platen glass 18. When the scanner 19 reaches to an image area of the document, read data (image data D2) are sent to the memory unit 30 in correspondence to the image process mode set by the image process controller 102.

When the scanner reaches to the read end position, the image read controller 103 sends a scan end report to the image process controller 102. In response thereto, the image process controller 102 and the memory controller 106 sends a read end report to the timing controller 105. Then, the timing controller 105 sends a compression request command to the memory controller 106. In response thereto, the memory controller 106 sets a read address to read from the image memory 31, XY length information, a write address to the code memory 33, a mode to be set for the compressor 32 and the like. Then, the image data are coded for compression and the code data are stored in the code memory 33. If an insertion-position-specifying document detection report is already received from the document feed controller 107, information of "document image specifying insertion position" and "need of image rotation" (or "need of image shift") are written as additional information to the management table MT1. If an insertion-position-specifying document detection report is not received from the document feed controller 107, information of "document image not specifying insertion position" and "no need of image rotation" (or "no need of image shift") are written as additional information to the management table MT1. After compression ends, the memory controller 106 sends a compression end report to the timing controller 105. Then, the timing controller 105 sends a document change request command to the document feed controller 107. If there is a next document on the document tray 51 in the automatic document feeder 50, image read processing for the next document is started.

Figure 13:
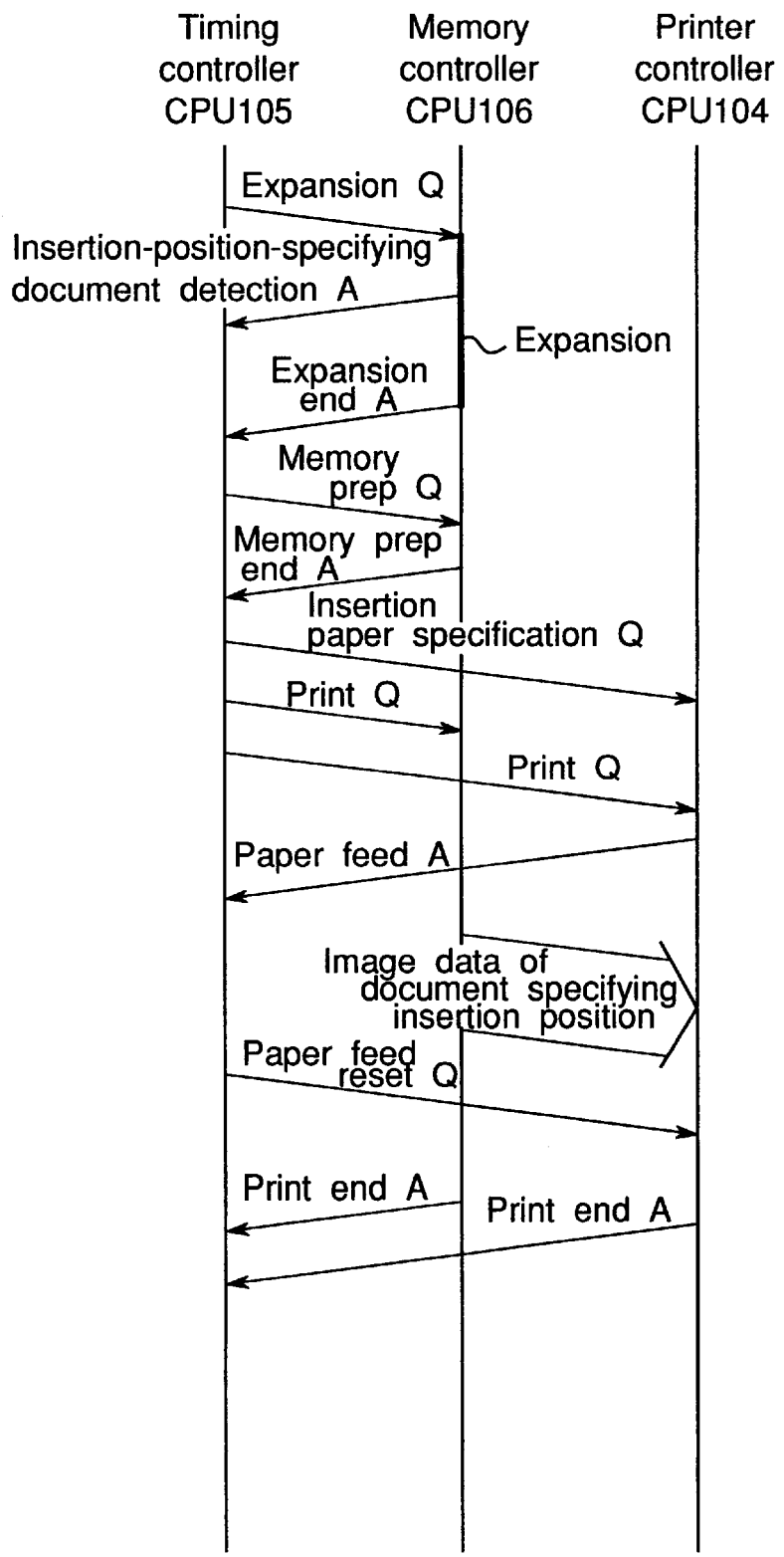
FIG. 13 is a sequence diagram of image forming in the first paper insertion mode.

FIG. 13 is a sequence diagram for the first paper insertion mode of communications of commands, reports and image data between the timing controller 105, the memory controller 106 and the printer controller 104. First, the timing controller 105 sends an expansion request command to the memory controller 106. In response thereto, the memory controller 106 sets a read address from the code memory 33, the amount of the data, a write address to the image memory 31, XY length information, a mode to be set for the expander 34, and the like. Then, expansion is started, and image data are written to the image memory 31. In the expansion, if the memory controller 106 decides from the management table MT1 that the image data is the document specifying insertion position, it sends an insertion-position-specifying document detection report to the timing controller 105. When the expansion ends, the memory controller 106 sends an expansion end report to the timing controller 105. In response thereto, the timing controller 105 sends a memory preparation request command to the memory controller 106. Then, the memory controller 106 sets conditions of the circuits in the internal hardware for sending the image data D3 from the image memory 31 to the print processor 40, and a read start address to the image memory 31, XY length information and the like for the image memory 31. When the memory preparation ends, the memory controller 106 sends a memory preparation end report to the timing controller 105. If the timing controller 105 has received an insertion-position-specifying document detection report, it sends to the printer controller 104 a command for designating a paper cassette containing papers to be inserted. On the other hand, if the timing controller 105 has not yet received an insertion-position-specifying document detection report, it does not send the command to the printer controller 104, or the paper cassette is not changed. After receiving the memory preparation end report, the timing controller 105 sends a print request command to the memory controller 106 and to the printer controller 104. In response thereto, the printer controller 104 sends a paper feed report to the timing controller 105 informing that a sheet of paper is fed to a predetermined position. Then, image data D3 read from the image memory 31 are processed by the print processor 40 to perform actual image forming processes. During the image forming, if the management table MT1 includes additional information of "need of image rotation", image data rotated by 90° by the rotation processor 35 are output as the image data D3. If the management table MT1 includes additional information of "need of image shift", the read timing of the image data is controlled so as to shift the position of the image to be formed on the sheet of paper in order to form the image at the same position as the other documents. When the paper feed report is received from the printer controller 104, the timing controller 105 sends a paper cassette reset request command to the printer controller 104 to select the previous paper cassette if the paper cassette has been changed for paper insertion. After image forming is completed, the printer controller 104 and the memory controller 106 send a print end report to the timing controller 105. Then, the timing controller 105 sends a memory clear request command and the like to the memory controller 106, though not shown in FIG. 13.

Figure 14:
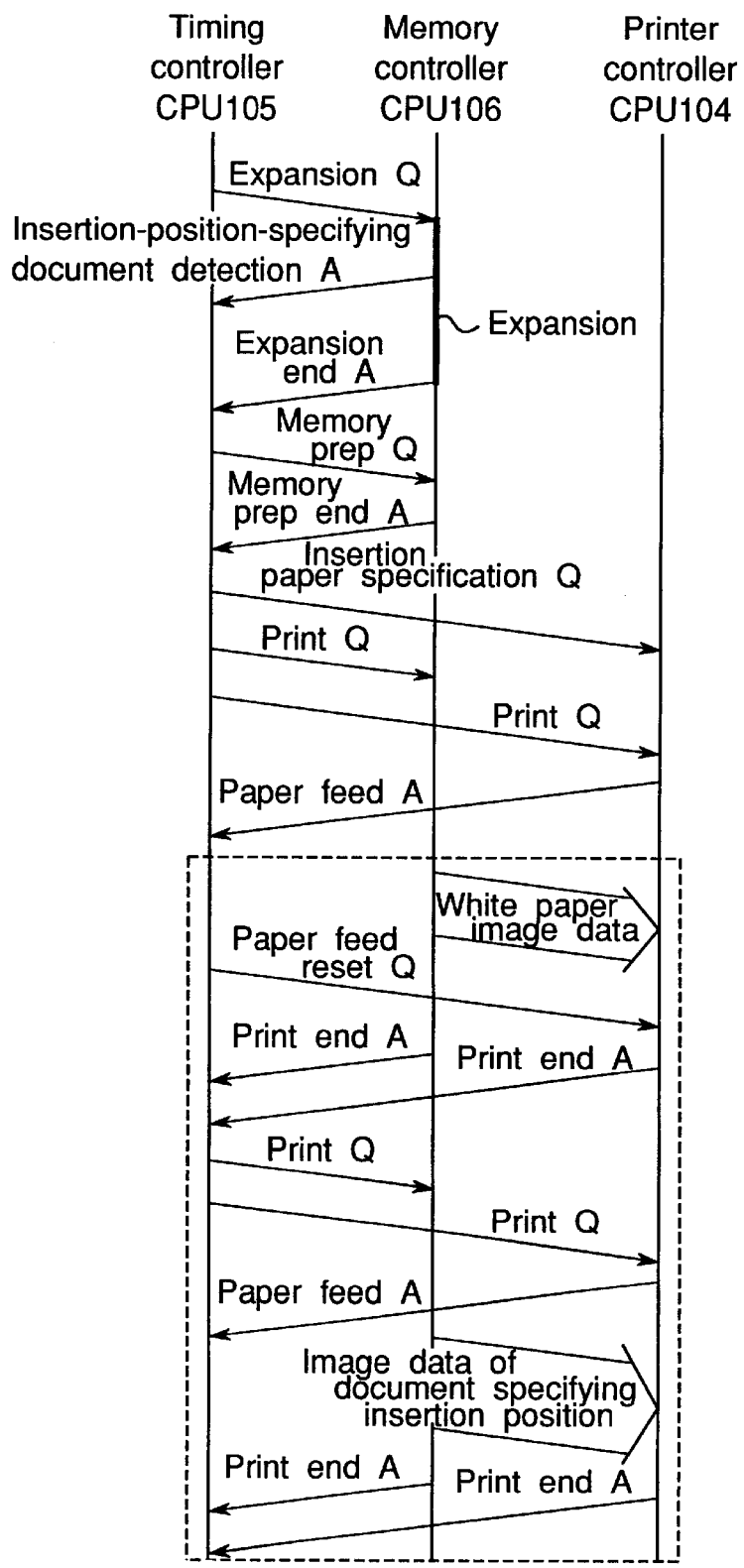
FIG. 14 is a sequence diagram of image forming in the second paper insertion mode.

FIG. 14 is a sequence diagram for the second paper insertion mode of communications of commands, reports and image data between the timing controller 105, the memory controller 106 and the printer controller 104. The sequence before a part enclosed with a dashed line is the same as the counterpart shown in FIG. 13, and it is not explained here for avoiding duplicated explanation.

In the sequence for the second paper insertion mode, after the printer controller 104 sends the paper feed report to the timing controller 105 the memory controller 106 sends image data of a white document to the printer controller 104. Then, the printer controller 104 discharges a supplied paper without printing any image thereon. Then, the timing controller 105 sends a paper cassette reset request command to the printer controller 104 to select the previous paper cassette for normal papers. After image forming is completed for the insertion paper, the printer controller 104 and the memory controller 106 send a print end report to the timing controller 105. The timing controller 105 sends a command to select the previous cassette to the printer controller 104 in correspondence to the above paper feed report. When the print end report is received, the timing controller 105 sends a print request command to the printer controller 104 and to the memory controller 106. After receiving the print request command, the printer controller 104 sends a paper feed report to the timing controller 105 to inform that a sheet of paper is supplied to a predetermined position. Then, the image data D3 read from the image memory 31 is processed by the print processor 40 to perform actual image forming processes. During the image forming, if the management table MT1 includes additional information of "need of image rotation", image data rotated by 90° by the rotation processor 35 are output as the image data D3. If the management table MT1 includes additional information of "need of image shift", the read timing of the image data is controlled so as to shift the position of the image to be formed on the sheet of paper in order to form the image at the same position as the other documents. After image forming is completed, the printer controller 104 and the memory controller 106 send a print end report to the timing controller 105. Then, the timing controller 105 sends a memory clear request command and the like to the memory controller 106, though not shown in FIG. 14.

Figure 15:
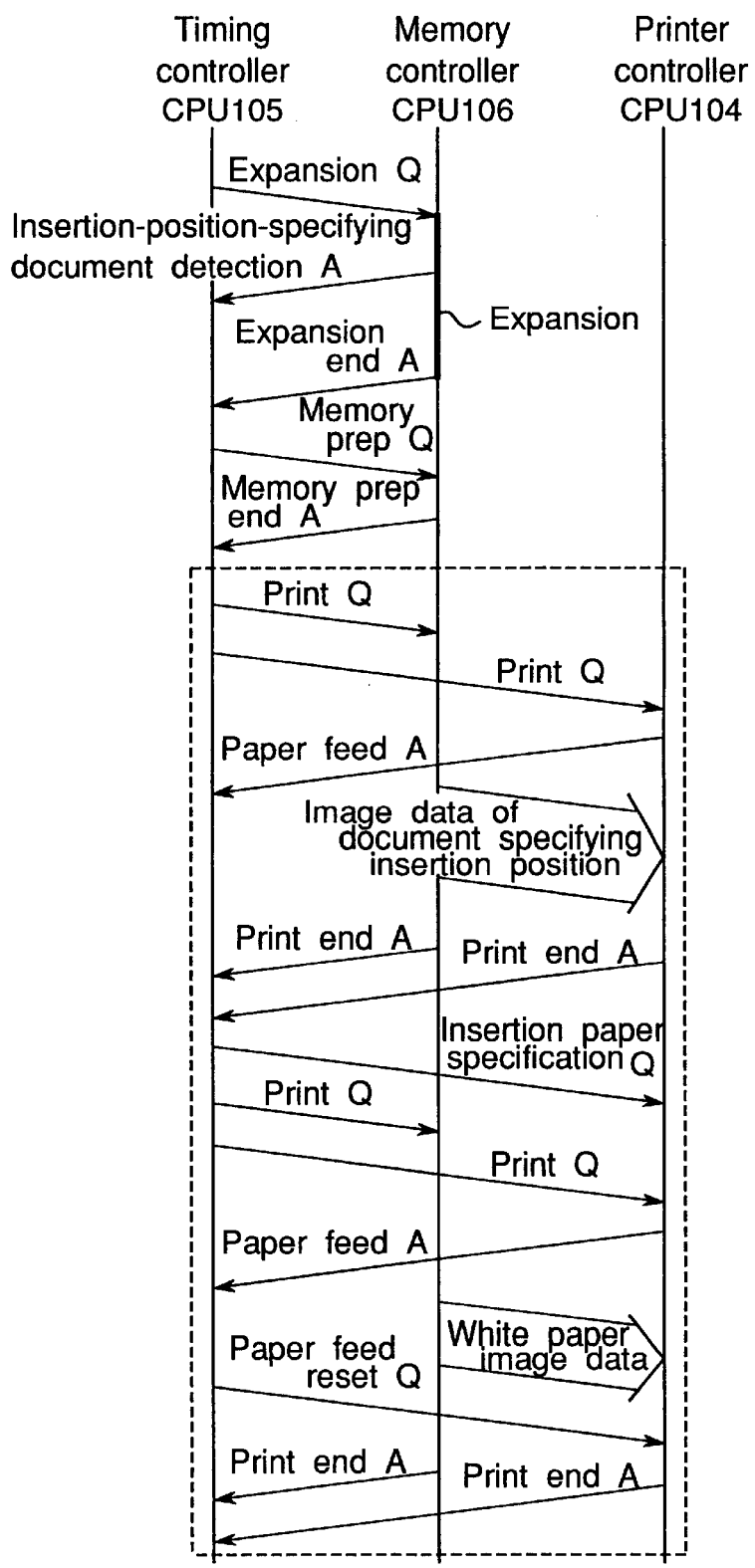
FIG. 15 is a sequence diagram of image forming in the third paper insertion mode.

FIG. 15 is a sequence diagram for the third paper insertion mode of communications of commands, reports and image data between the timing controller 105, the memory controller 106 and the printer controller 104. The sequence before a part enclosed with a dashed line is the same as the counterpart shown in FIG. 13, and it is not explained here for avoiding duplicated explanation.

In the sequence of the third paper insertion mode, after receiving the memory preparation end report from the memory controller 106, the timing controller 105 sends a print request command to the memory controller 106 and to the printer controller 104. Then, the printer controller 104 sends a paper feed report to the timing controller 105 informing that a sheet of paper is fed to a predetermined position. Then, the memory controller 106 sends image data D3 of a document specifying insertion position to the printer controller 104. During the image forming, if the management table MT1 includes additional information of "need of image rotation", image data rotated by 90° by the rotation processor 35 are output as the image data D3. If the management table MT1 includes additional information of "need of image shift", the read timing of the image data is controlled so as to shift the position of the image to be formed on the sheet of paper in order to form the image at the same position as the other documents. After image forming is completed, the printer controller 104 and the memory controller 106 send a print end report to the timing controller 105. In response thereto, the timing controller 105 sends a command for specifying a paper cassette containing papers to be inserted. Then, the timing controller 105 sends a print request command to the memory controller 106 and to the printer controller 104. In response thereto, the printer controller 104 sends a paper feed report to the timing controller 105 informing that a sheet of paper is fed to a predetermined position. Then, the memory controller 106 sends image data of a white document to the printer controller 104. Then, the printer controller 104 discharges a supplied paper without printing any image thereon. Then, the timing controller 105 sends a paper cassette reset request command to the printer controller 104 to select the previous paper cassette for normal papers. After image forming is completed for the inserted paper, the printer controller 104 and the memory controller 106 send a print end report to the timing controller 105. Then, the timing controller 105 sends a memory clear request command and the like to the memory controller 106, though not shown in FIG. 15.

Next, the processings of the operational panel controller 101, the image process controller 102, the image read controller 103, the printer controller 104, the timing controller 105, the memory controller 106 and the document feed controller 107 are explained with reference to flowcharts thereof.

Figure 16:
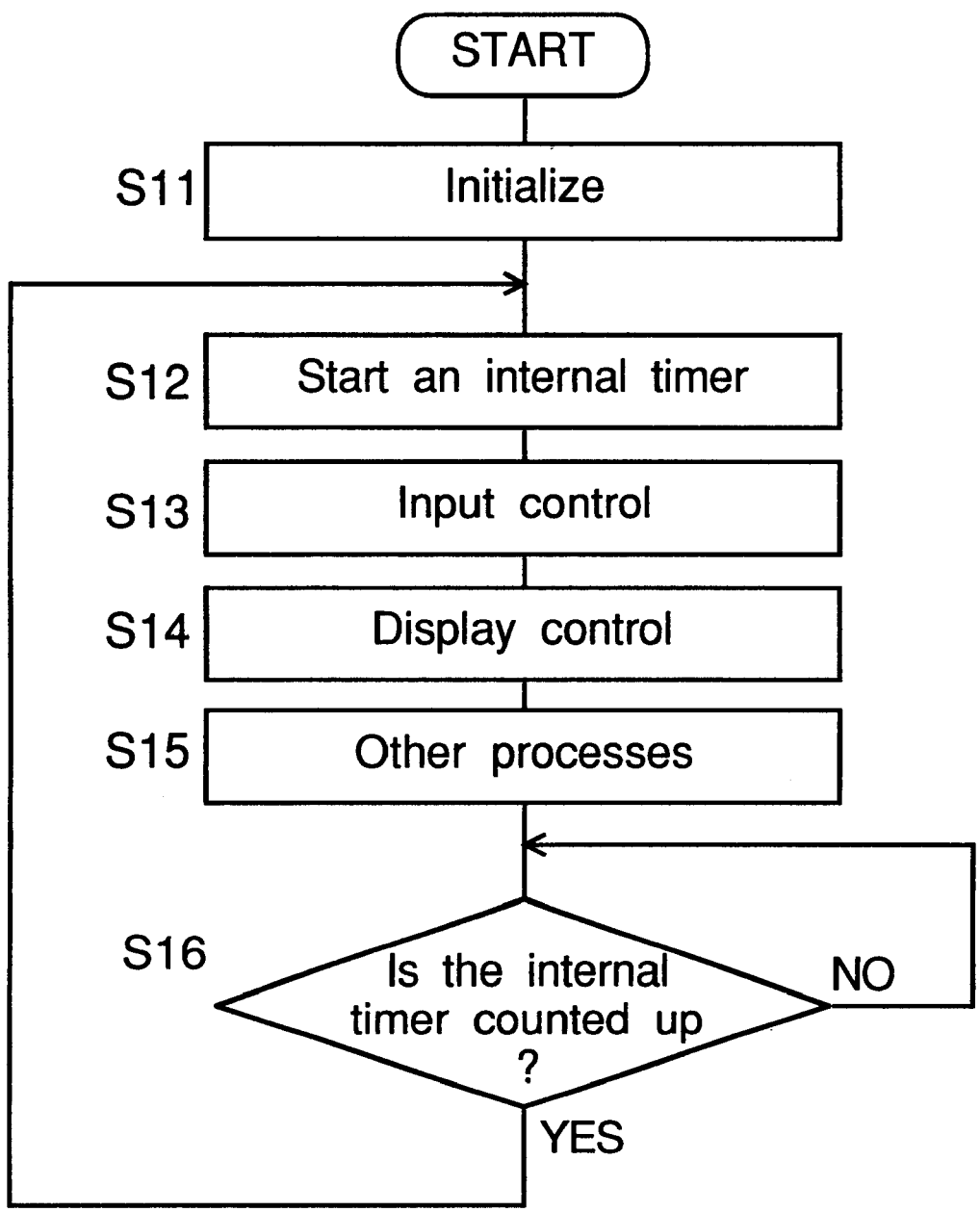
FIG. 16 is a flowchart of an operational panel controller.

FIG. 16 is a flowchart of the operational panel controller 101. After initialization (step S11), an internal timer is started (step S12) to define a time of one routine. Next, key-inputs with the keys provided in the operational panel 300 are processed to set copy conditions (step S13), and the display 301 provided in the operational panel 300 is controlled (step S14). After the other processes are controlled (step S15), it is waited that the internal timer is counted up (step S16). After the internal timer is counted up, the flow returns to step S12. Further, the operational panel controller 101 communicates with the other controllers 102–107 with interrupt processing.

Figure 17:
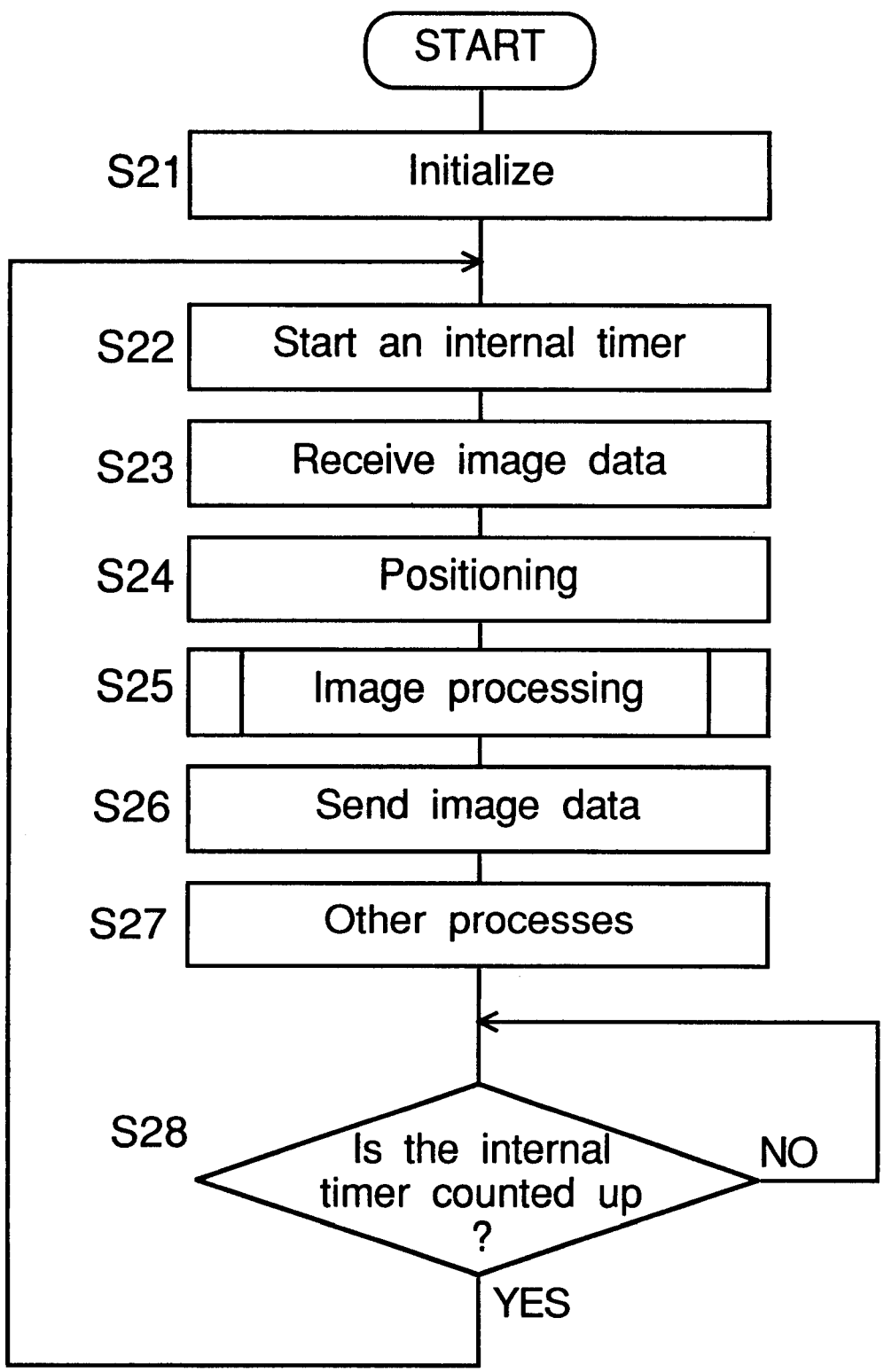
FIG. 17 is a flowchart of an image process controller.

FIG. 17 is a flowchart of the image process controller 102. After initialization (step S21), an internal timer is started (step S22) to define a time of one routine. Next, image data read with the CCD sensor 16 are received (step S23). Then, positioning of image data is performed to adjust the time difference due to the position difference of the CCD sensor 16 is performed (step S24). Next, image processing is performed as will be explained in detail later (step S25, refer to FIG. 18), and the image data are output (step S26). Then, the other processes are controlled (step S27), and after that the internal timer is waited to be counted up (YES at step S28), the flow returns to step S22. Further, the image process controller 102 communicates with the other controllers 101, 103–107 with interrupt processing.

Figure 18:
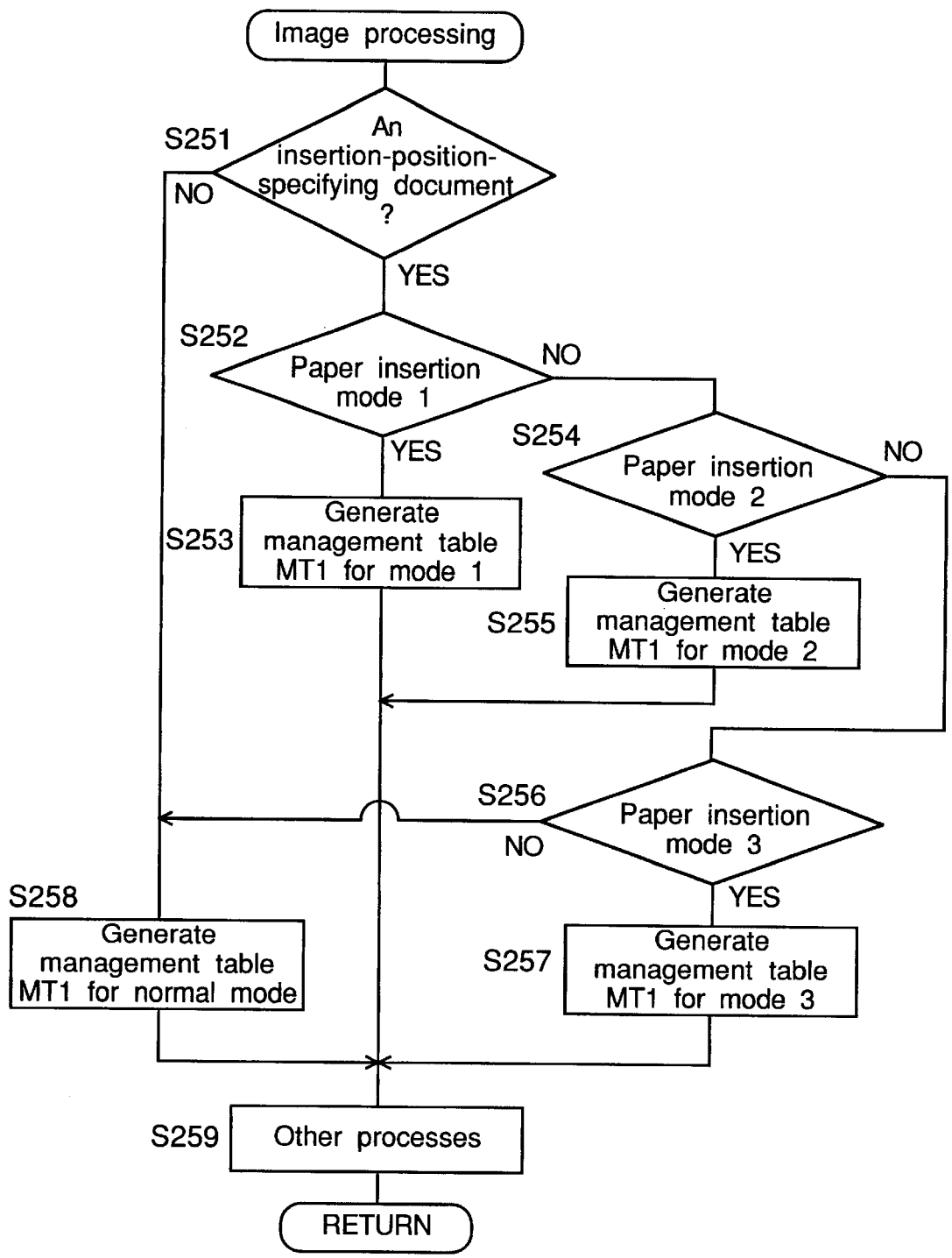
FIG. 18 is a flowchart of image processing.

FIG. 18 is a flowchart of the image processing (step 25 in FIG. 17). If an insertion-position-specifying document detection report is decided to be received from the document feed controller 107, the document put on the platen glass 18 is determined to be a document specifying an insertion position (YES at step S251). Then, the paper insertion mode is checked. If the first paper insertion mode is set (YES at step S252), the management table MT1 is produced for the first paper insertion mode (step S253) If the second paper insertion mode is set (YES at step S254), the management table MT1 is produced for the second paper insertion mode (step S255). If the third paper insertion mode is set (YES at step S256), the management table MT1 is produced for the third paper insertion mode (step S257). On the other hand, if an insertion-position-specifying document detection report is decided not to be received from the document feed controller 107, that is, the document put on the platen glass 18 is determined to be a normal document (NO at step S251), and if no paper insertion mode is set (NO at steps S252, S254 and S256) though the document put on the platen glass 18 is determined to be a document specifying an insertion position (YES at step S251), the management table MT1 is produced for the normal mode (step S258). After the other processes are performed (step S259), the flow returns.

Figure 19:
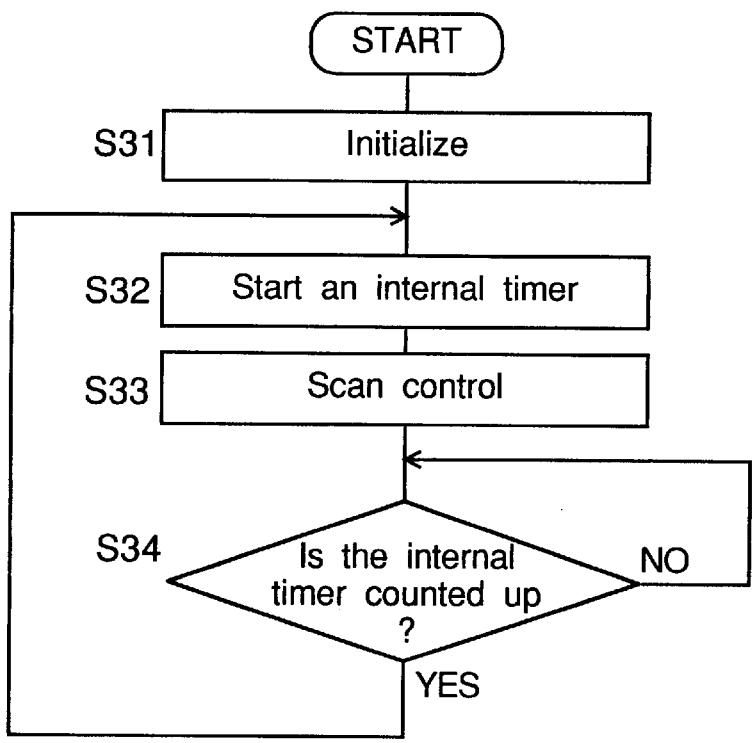
FIG. 19 is a flowchart of an image read controller.
Figure 20:
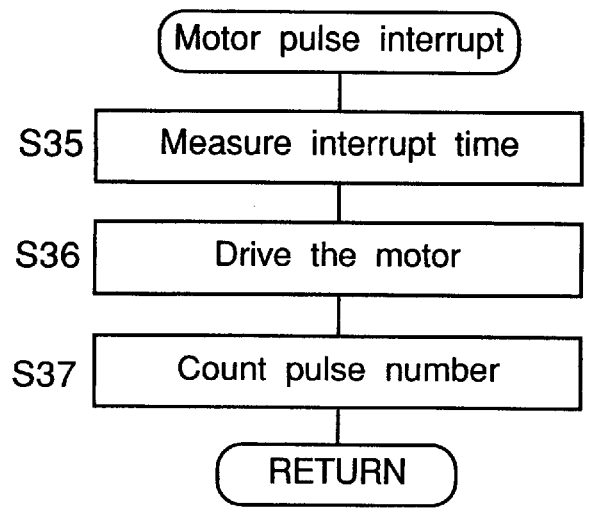
FIG. 20 is a flowchart of interrupt processing.

FIG. 19 is a flowchart of the image read controller 103. After initialization (step S31), an internal timer is started (step S32) to define a time of one routine. Next, the scan of the image reader 100 is controlled (step S33). After the internal timer is counted up (YES at step S34), the flow returns to step S32. FIG. 20 is a flowchart of interrupt processing of motor pulses. When an interrupt is received according to a motor pulse generated in synchronization with the rotation of the scan motor M2, an interrupt interval of the motor pulses is set (step S35), and the motor is controlled by turning on or off the power supply to the motor M2 (step S36), and the number of pulses is counted (step S37). Then, the flow returns. On the other hand, the image read controller 103 communicates with the image read processor 102 with use of interrupt processing.

Figure 21:
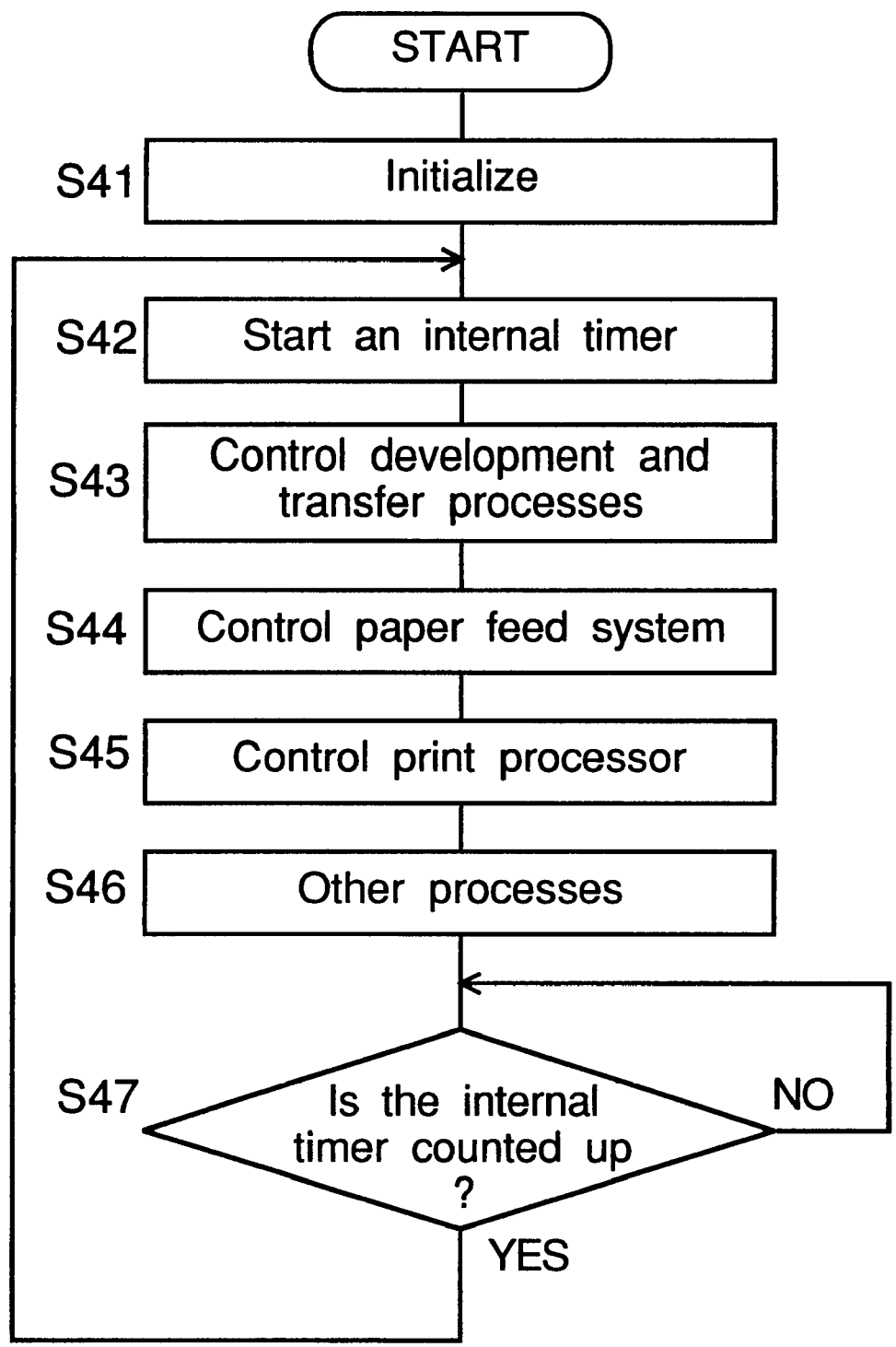
FIG. 21 is a flowchart of a printer controller.

FIG. 21 is a flowchart of the printer controller 104. After initialization (step S41), an internal timer is started (step S42) to define a time of one routine. Next, the development and transfer system in the printer 200 is controlled (step S43), a paper feed system in the printer 200 is controlled (step S44), and the print processor 40 is controlled (step S45). After the other processes are controlled (step S46), it is waited that the internal timer is counted up (step S47). After the internal timer is counted up, the flow returns to step S42. Further, the printer controller 104 communicates with the timing controller 105 with interrupt processing.

Figure 22:
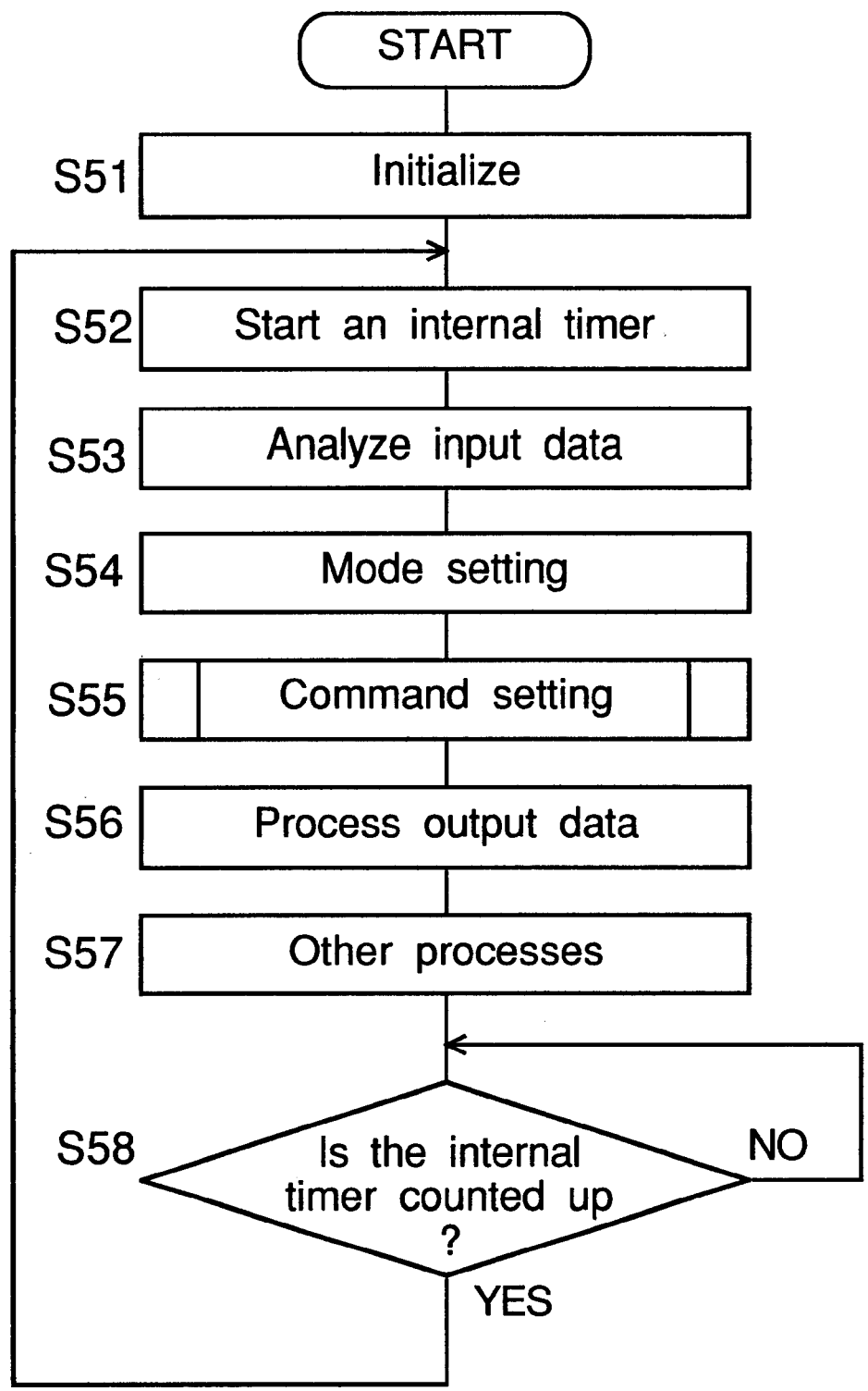
FIG. 22 is a flowchart of a timing controller.

FIG. 22 is a flowchart of the timing controller 105 for controlling the entire copying machine by setting various commands, the operation mode and the like to the other controllers. After initialization (step S51), an internal timer is started (step S52) to define a time of one routine. Next, input data received from the other controllers with interrupt processing are analyzed (step S53). Then, if operation mode is changed according to the analysis results, the mode is set (step S54), and a command is set (step S55, refer to FIG. 23). Then, the other processes are controlled (step S57), and after the internal timer is waited to be counted up (YES at step S58), the flow returns to step S52.

Figure 23:
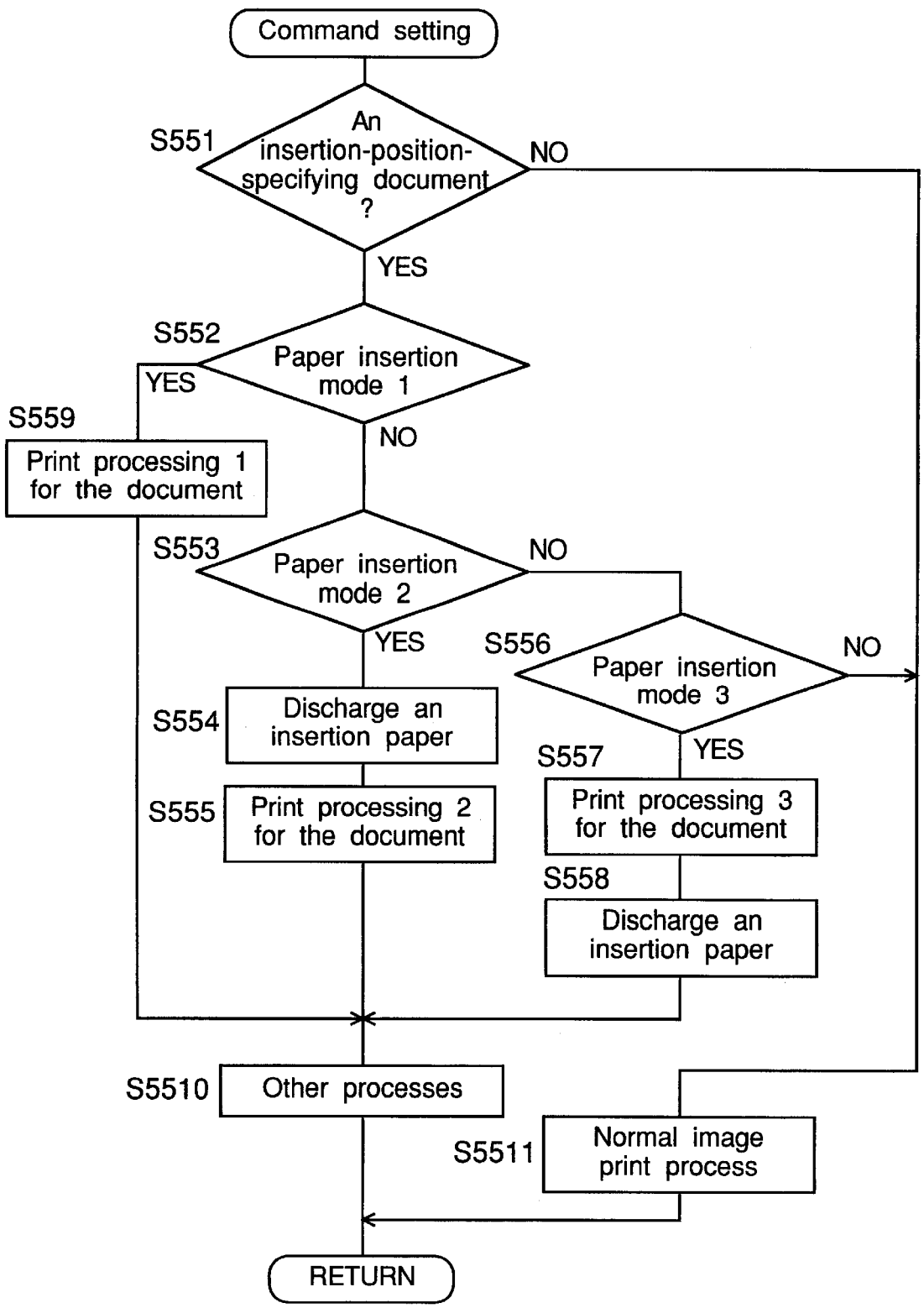
FIG. 23 is a flowchart of command setting.

FIG. 23 is a flowchart of the command setting (step S55 in FIG. 22). In this flow, the timing controller 105 issues various request commands according to the sequence shown in FIGS. 13, 14 and 15. In response to the issue of the request commands from the timing controller 105, the memory controller 106 and the print controller 104 produces copies as illustrated with reference to FIGS. 3, 4 and 5.

First, if a document specifying an insertion position is decided to be printed (YES at step S551), the mode is checked. If the first paper insertion mode is set (YES at step S552), the processing is performed for printing the image of the document on a sheet of paper for paper insertion (step S559). The details of the issue processing of the request commands executed at step S559 are shown in the sequence in FIG. 13. If the second paper insertion mode is set (YES at step S553), a sheet of paper for paper insertion is discharged onto the tray 54 without printing any image on the paper (step S554), and the processing is performed next for printing the image of the document on a normal paper (step S555). The details of the issue processing of the request commands executed at steps S554 and S555 are shown in the sequence in FIG. 14. If the third paper insertion mode is set (YES at step S556), the processing is performed for printing the image of the document on a normal paper (step S557), and a sheet of paper for paper insertion is discharged next onto the tray 54 without printing any image on the paper (step S558). The details of the issue processing of the request commands executed at steps S557 and S558 are shown in the sequence in FIG. 15. Then, after the other processes are performed (step S5510), the flow returns. On the other hand, if the document on the platen glass 18 is decided not to be a document specifying an insertion position (NO at step SS1), or though the document on the platen glass 18 is decided to be a document specifying an insertion position (YES at step S551), if no paper insertion mode or the normal mode is set (NO at steps S552, S553 and S556), image forming is performed normally (step S5511), and the flow returns.

Figure 24:
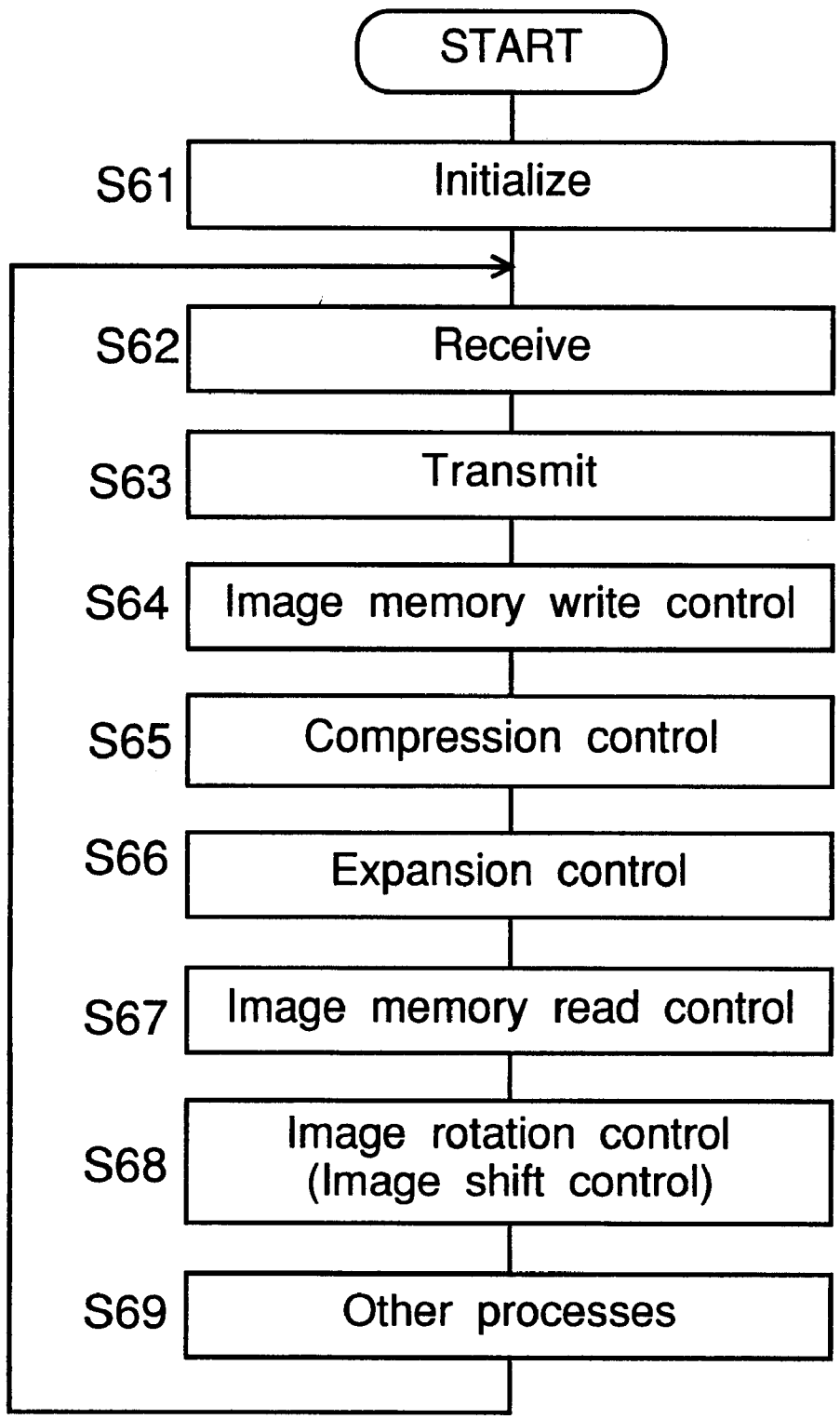
FIG. 24 is a flowchart of a memory controller.

FIG. 24 is a flowchart of the memory controller 106 which controls the memory unit 30. After initialization (step S61), commands are received from the other controllers (step S62), and reports are sent to the other controllers (step S63). Then, write processing to the image memory 31 is performed according to the previous processings (step S64). After the write processing ends, compression control processing (step S65), expansion control processing (step S66), and data read control processing from the image memory 31 (step S67) are performed. Then, the image is rotated or shifted for the document specifying an insertion position, based on the additional information stored in the management table MT1 (step S68). In the image rotation, the document image is rotated by 90° to a predetermined direction by the image rotation processor 35. In the image shift, the data read timing is changed when the image data is read from the image memory 31. Thus, the image of the document specifying an insertion position is formed on a sheet of paper at the same position as the other documents. After the other processes are performed (step S69), the flow returns to step S62.

Figure 25:
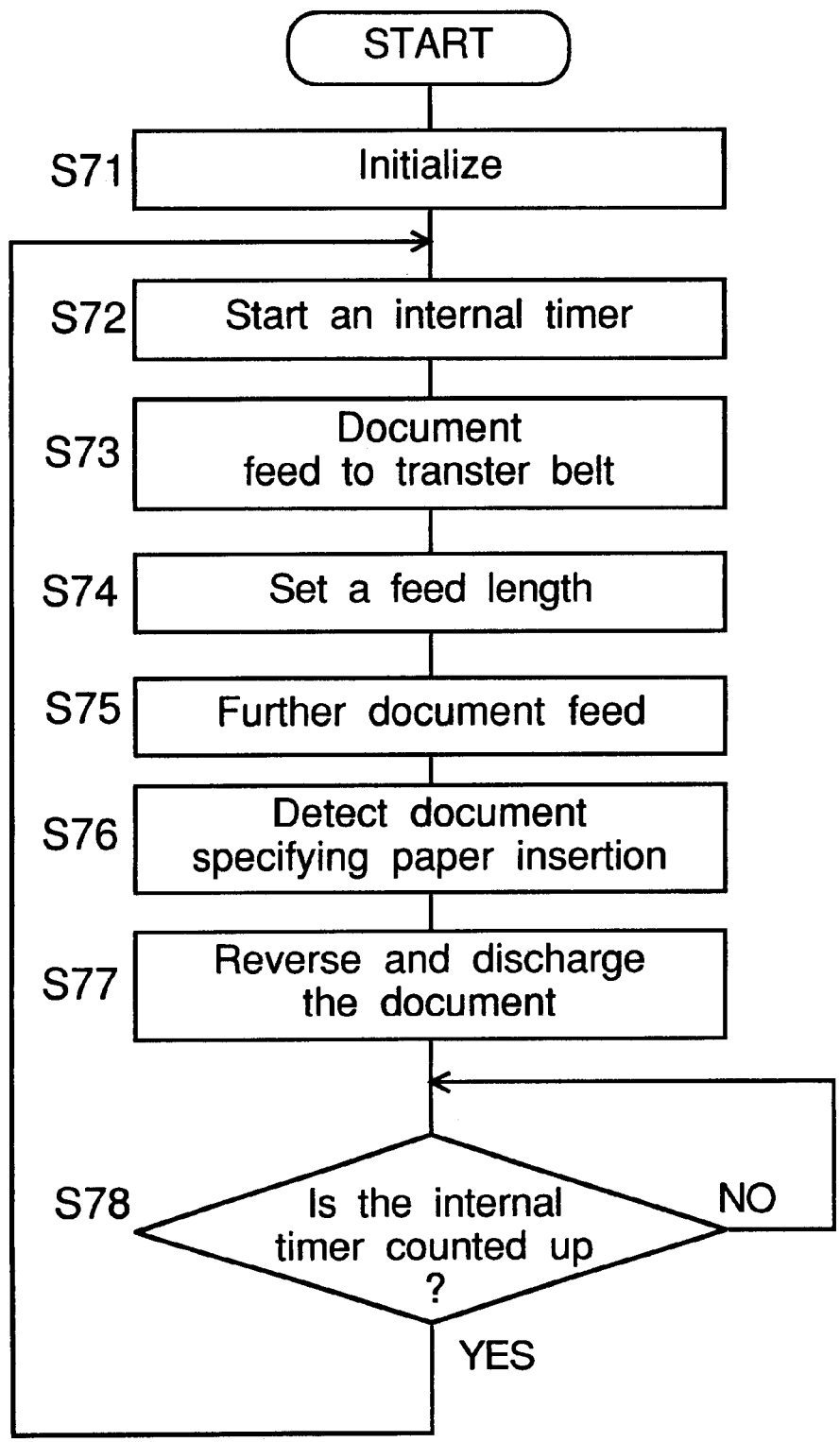
FIG. 25 is a flowchart of a document feed controller.

FIG. 25 is a flowchart of the document feed controller 107 for controlling the automatic document feeder 50. After initialization (step S71), an internal timer is started (step S72) to define a time of one routine. Next, one of the documents put on the document tray 51 is fed to the belt 52 (step S73), and a feed length by the belt 52 is set (step S74). Then, by controlling the belt 52, the document is set on the predetermined read position and fed to the reversal roller 53 (step S75). Next, a document specifying an insertion position is detected (step S76). The detection whether a document is the document specifying an insertion position is performed by deciding whether the document has a different size or a different position from the counterpart of the document which has been put first on the platen glass 18. For example, the paper pass time is detected with the sensor SE5 to determine the paper length along the document feed direction. Then, a document put in a direction different from other documents is decided to be a document specifying an insertion position (refer to FIG. 4). In a different way, according to the detection result of the sensor SE4, a document shifted by a predetermined length in the main scan direction from other documents on the document tray 51 is determined as a document specifying an insertion position (refer to FIG. 5). Then, after the document reaches to the reversal roller 53, it is discharged or reversed to the belt 52 again according to the kind of the document (step S77). Next, after the internal timer is waited to be counted up (YES at step S78), the flow returns to step S72.

As explained above, a document specifying an insertion position is detected by putting it on the document tray 51 of the automatic document feeder 50 in a way different from other documents in a plurality of documents read by the image reader 100. When the document 51 is put on the document tray 51, for example, the direction of the document put on the document tray 51 is changed or the position thereof is shifted to a certain direction, as shown in FIGS. 4 and 5. Therefore, the position at which a sheet of paper is inserted is specified simply without using a special partition paper for specifying an insertion position. When the image of the document specifying an insertion position is formed on a sheet of paper, the image data is rotated or shifted appropriately to form the image at the same position as the images of the other documents.

The above-mentioned copying machine uses electrophotographic processes, but the invention is not limited to an electrophotographic copying machine. For example, other processes than electrophotographic processes may be employed. The above-mentioned copying machine produces a monochromatic copy. However, the invention can also be used for a color copying machine.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:
   an image reading unit which reads a plurality of documents successively to generate image data thereof;
   an image forming unit which forms an image on a sheet based on the image data generated by said image reading unit;
   a detecting unit which detects whether the document to be read by said image reading unit is a specifying document or not, wherein the specifying document denotes a document which is read in a state different from other documents in the plurality of documents read by said image reading unit;
   a first sheet feeding unit to supply a first sheet for forming an image thereon;
   a second sheet feeding unit to supply a second sheet different from the first sheet; and
   a controller which makes said first sheet feeding unit supply the first sheet for forming an image thereon and which makes said second sheet feeding unit supply the second sheet instead of the first sheet when said detecting unit detects the specifying document.

2. The image forming apparatus according to claim 1, further comprising a correction unit which corrects the image data generated by said image reading unit so that an image of the specifying document is formed on a sheet in the same state as images of the other documents.

3. The image forming apparatus according to claim 1, wherein said controller executes control such that an image of the specifying document is formed on the second sheet.

4. The image forming apparatus according to claim 1, wherein said controller executes control such that an image of the specifying document is formed on the first sheet supplied just before the second sheet.

5. The image forming apparatus according to claim 1, wherein said controller executes control such that an image of the specifying document is formed on the first sheet supplied just after the second sheet.

6. The image forming apparatus according to claim 1, wherein said detecting unit detects the specifying document by comparing the document with a document which is read first by said image reading unit among the plurality of documents.

7. The image forming apparatus according to claim 6, wherein the state different from the other documents is a state wherein the document is rotated by 90° relative to the document which is read first by said image reading unit.

8. The image forming apparatus according to claim 6, wherein the state different from the other documents is a state wherein the document is shifted by a predetermined length in a main scan direction relative to the document which is read first by said image reading unit.

9. An image forming apparatus comprising:
   an automatic document feeder which feeds a plurality of documents put on a document putting portion successively onto an image reading area;
   an image reader which reads a document in the image reading area to generate image data thereof;
   an image forming unit which forms an image on a sheet based on the image data generated by said image reading unit;
   a detector which detects whether the document to be read by said image reader is a specifying document or not, wherein the specifying document denotes a document which is put on the document putting portion in a state different from other documents in the plurality of documents;
   a first sheet container to contain first sheets for forming an image thereon;
   a second sheet container to contain second sheets different from the first sheets; and
   a controller which makes a first sheet supplied from said first sheet container for forming an image thereon and which makes a second sheet supplied from said second sheet container instead of the first sheet when said detector detects that the specifying document.

10. The image forming apparatus according to claim 9, further comprising a correction unit which corrects the image data so that an image of the specifying document is formed on a sheet in the same state as images of the other documents.

11. The image forming apparatus according to claim 9, which can alternatively select a mode in a plurality of modes on image forming with use of the second sheet, wherein said controller selects a sheet on which an image of the specifying document is formed according to the selected mode.

12. The image forming apparatus according to claim 11, wherein the plurality of modes include a first mode to form the image of the specifying document on the first sheet and a second mode to form the image of the specifying document on the second sheet.

13. The image forming apparatus according to claim 12, wherein said controller executes control such that no image is formed on the second sheet when the first mode is selected.

14. The image forming apparatus according to claim 9, wherein said detector is provided in said automatic document feeder around the document putting portion to detect a position of the document put on the document putting portion.

15. The image forming apparatus according to claim 9, wherein said detector is provided along a document feed path in said automatic document feeder to detect a length of the document along the paper feed direction.

16. A method for forming images of a plurality of documents on sheets, the method comprising the steps of:

(a) reading a plurality of documents successively to generate image data thereof;

(b) detecting whether a document to be read is a specifying document or not, wherein the specifying document denotes a document which is read in a state different from other documents in the plurality of documents; and (c) supplying a first sheet for forming an image thereon, and supplying a second sheet different from the first sheet instead of the first sheet when the specifying document is detected at step (b).

17. The method according to claim 16, further comprising the step of correcting the image data of the specifying document so that an image of the specifying document is formed on a sheet in the same state as images of the other documents.

18. The method according to claim 16, further comprising the step of selecting whether an image of the specifying document is formed on the first sheet or on the second sheet.

19. The method according to claim 18, further comprising the step of further selecting whether the image of the specifying document is formed on the first sheet supplied just before the second sheet or just after the second sheet when the image of the specifying document is selected to be formed on the first sheet.

20. The method according to claim 18, wherein no image is formed on the second sheet when the image of the specifying document is selected to be formed on the first sheet.

21. The method according to claim 16, wherein in the step (b) the document is detected as the specifying document when the document is read in a state wherein the document is rotated by 90° relative to a document read first among the plurality of documents.

22. The method according to claim 16, wherein in the step (b) the document is detected as the specifying document when the document is read in a state wherein the document is shifted by a predetermined length in a main scan direction relative to a document read first among the plurality of documents.

* * * * *